(12) United States Patent
Kondo et al.

(10) Patent No.: US 7,366,083 B2
(45) Date of Patent: Apr. 29, 2008

(54) INFORMATION RECORDING MEDIUM HAVING SUBSTRATE WITH MICROSCOPIC PATTERN AND REPRODUCING APPARATUS THEREFOR

(75) Inventors: Tetsuya Kondo, Kanagawa-ken (JP); Akira Nishizawa, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 11/539,931

(22) Filed: Oct. 10, 2006

(65) Prior Publication Data

US 2007/0086290 A1  Apr. 19, 2007

Related U.S. Application Data

(60) Continuation of application No. 11/008,405, filed on Dec. 10, 2004, now Pat. No. 7,139,236, which is a division of application No. 10/728,960, filed on Dec. 8, 2003, now Pat. No. 6,873,595, which is a division of application No. 10/135,844, filed on May 1, 2002, now Pat. No. 6,693,873.

(30) Foreign Application Priority Data

May 2, 2001 (JP) ............... 2001-134954
Apr. 26, 2002 (JP) ............... 2002-125978

(51) Int. Cl.
*G11B 7/24* (2006.01)
(52) U.S. Cl. ............... 369/275.4; 369/275.3; 369/44.13
(58) Field of Classification Search .. 369/275.1–275.5, 369/44.13, 283, 276, 278, 44.29, 44.36, 47.1, 369/59.26, 53.2, 44.26
See application file for complete search history.

(56) References Cited

U.S. PATENT DOCUMENTS 6,097,695 A   8/2000  Kobayashi (Continued)

FOREIGN PATENT DOCUMENTS

JP  02-247818  10/1990

(Continued)

OTHER PUBLICATIONS

Warner Advanced Media Operations (WAMO) DVD, obtained on Jun. 28, 1999, "DVD 18 Requirements","Process Fundamentals", "DVD 14/18 First Generation Equipment", Manufacturing Considerations for DVD 14/18.

(Continued)

*Primary Examiner*—Ali Neyzari
(74) *Attorney, Agent, or Firm*—Connolly Bove Lodge & Hutz LLP

(57) ABSTRACT

A recording medium includes a substrate having a microscopic pattern, which includes a shape of continuous substance of approximately parallel grooves formed with a convex shaped section and a concave shaped section alternating on a surface of the substrate. A recording layer is formed on the microscopic pattern and a light transmitting layer has a thickness of 0.05 mm to 0.12 mm formed on the recording layer. The microscopic pattern satisfies a relation of $P \leq \lambda/NA$, wherein P is a pitch of the convex shaped section, $\lambda$ is a wavelength of a reproducing light beam and NA is a numerical aperture of an objective lens. The microscopic pattern also includes modulated address information formed on both side walls of the convex shaped section viewed from the light transmitting layer as a wobble, both the side walls being parallel to each other, and furthermore wherein the address information is modulated by the phase-shift keying modulation system. A reproducing apparatus is particularly suited for the recording medium.

3 Claims, 18 Drawing Sheets

U.S. PATENT DOCUMENTS

| | | | |
|---|---|---|---|
| 6,128,273 A | 10/2000 | Horie et al. | |
| 6,160,776 A | 12/2000 | Seo | |
| 6,195,325 B1 | 2/2001 | Okanishi | |
| 6,256,282 B1 | 7/2001 | Yamagami et al. | |
| 6,693,873 B2 * | 2/2004 | Kondo et al. | 369/275.4 |
| 7,012,860 B2 * | 3/2006 | Kondo | 369/44.26 |
| 7,133,331 B2 * | 11/2006 | Kondo et al. | 369/44.13 |
| 7,170,830 B2 * | 1/2007 | Kondo | 369/44.13 |
| 7,177,262 B2 * | 2/2007 | Kondo et al. | 369/275.4 |
| 7,193,938 B2 * | 3/2007 | Kondo | 369/44.26 |

FOREIGN PATENT DOCUMENTS

| | | |
|---|---|---|
| JP | 10-106047 | 4/1998 |
| JP | 11-039660 | 2/1999 |
| JP | 11-250504 | 9/1999 |
| JP | 11-273090/1999 | 10/2000 |
| JP | 2000-285523 | 10/2000 |
| JP | 2000-311386 | 11/2000 |
| JP | 2001-101714 | 4/2001 |
| WO | WO-02/31821 | 4/2002 |

OTHER PUBLICATIONS

Hayashi et al., Matsushita Electric Industrial Co., Ltd., International Symposium on Optical Memory 2001, Oct. 2001, "New Replication Process Using Function-Assigned Resins for Dual-Layered Disk With 0.1 mm-Thick Cover Layer".

* cited by examiner

INFORMATION RECORDING MEDIUM HAVING SUBSTRATE WITH MICROSCOPIC PATTERN AND REPRODUCING APPARATUS THEREFOR

This application is a Continuation of application Ser. No. 11/008,405, filed on Dec. 10, 2004 now U.S. Pat. No. 7,139,236, which is a Divisional of application Ser. No. 10/728,960, filed on Dec. 8, 2003 (now U.S. Pat. No. 6,873,595), which is a Divisional of application Ser. No. 10/135,844, filed on May 1, 2002 (now U.S. Pat. No. 6,693,873); and for which priority is claimed under 35 U.S.C. § 120; and this application claims priority of Application No. 2002-125978 filed in Japan on Apr. 26, 2002 under 35 U.S.C. § 119, and Application No. 2001-134954 filed in Japan on May 2, 2001 under 35 U.S.C. § 119; the entire contents of all are hereby incorporated by reference.

BACKGROUND OF THE INVENTION

1. Field of the Invention

The present invention relates to an information recording medium used for a reproducing apparatus and a recording apparatus, which read out information from the information recording medium with making it move relatively, particularly, relates to an information recording medium to be recorded and/or reproduced by an optical device.

2. Description of the Related Art

Until now, recording and reproducing information by using a laser beam or like has been performed by an optical disc system.

There existed a DVD (Digital Versatile Disc) as one of information recording mediums used for such an optical disc system. Such a DVD disc has an information recording surface composed of an information track and an information pit array, which are engraved in a rugged shape on a surface of a transparent plastic substrate having a thickness of 0.6 mm and a diameter of 120 mm by a forming process. The information track is provided for recording information, and the information pit array is provided for reproducing the information by scanning the pit array.

In a case of a reproducing type information recording medium, a reflective layer composed of a high reflectivity film such as gold and aluminum is formed on an information recording surface. Further, in a case of a recording type information recording medium, a dye film is formed on the information recording surface.

With respect to a recording type information recording medium formed with a dye film on the information recording surface, there is provided a DVD-R (Digital Versatile Disk-Recordable) as a recordable information recording medium. Furthermore, there is provided a rewritable information recording medium, which is formed with magneto-optical recording film on the information recording surface.

FIG. 32 is a cross sectional view of a conventional recording type DVD-R disc.

Such a DVD-R disc mentioned above is actually composed a structure shown in FIG. 32. In FIG. 32, a DVD-R disc 70 is composed of a transparent plastic substrate 71 having an information recording surface 710 on its surface, a recording layer 72, an adhesive layer 73 and a dummy substrate 74. The recording layer 72 and the adhesive layer 73 are laminated on the substrate 71 in order, and then the dummy substrate 74 is affixed on the adhesive layer 73. The information recording layer 710 is further composed of an information track and an information pit array, which are engraved in a rugged shape.

Generally, a convex shaped section, which projects into a side to be irradiated by a laser beam for recording and reproducing, is applied for an information track. In the convex shaped section, an information track composed of a groove and address information composed of a pit are formed as a continuous line or as an intermittent pit array with respect to a scanning direction of a laser beam. These information track and address information are formed by a forming method of a so-called stamper method. The intermittent pit array is provided for a user to record information in a predetermined information track accurately by positioning the predetermined information track.

According to a manufacturing method of recording type DVD-R disc by the stamper method, an information track and address information, which are formed by a cutting method, are provided in a concave shaped section "AA" of the substrate 71 as shown in FIG. 32.

The recording type DVD-R disc 70 is recorded and reproduced by irradiating a laser beam "LB" having a wavelength of 635 nm on the information recording surface 710 from the substrate 71 side. In other words, the laser beam "LB" is irradiated on the concave shaped section "AA" of the substrate 71, and then the recording type DVD-R disc is recorded and reproduced.

The concave shaped section "AA" and a convex shaped section "BB" of the substrate 71 are referred to as a groove and a land respectively.

FIG. 33 is a cross sectional view of a next generation type information recording medium having higher density than a current DVD disc. Such a next generation type information recording medium has been developed actively. In FIG. 33, a next generation type information recording medium 75 in high density is composed of a substrate 71 having an information recording surface 710 in a rugged shape on its surface, a recording layer 72 and a light transmitting layer 76 having a thickness of 0.1 mm, wherein they are laminated in order. The substrate 71 is made of a transparent plastic disc having a thickness of 1.1 mm and a diameter of 120 mm and manufactured by the stamper method as the same method as for a DVD disc. The next generation type information recording medium 75 is recorded and reproduced by irradiating a laser beam "LB" having a wavelength of 400 nm on an information track of the information recording surface 710 and a concave shaped section "AA" or a groove of the substrate 71.

That is to say, in either of the recording type DVD-R disc 70 and the next generation type information recording medium 75, recording and reproducing is performed with respect to the concave shaped section "AA" on the substrate 71. When viewing from a different angle, in the case of the recording type DVD-R disc 70, information is recorded on and reproduced from a concave shaped section, which projects into a side to be irradiated by a laser beam for recording and reproducing. On the contrary, in the case of the next generation type information recording medium 75, information is recorded on and reproduced from a convex shaped section, which becomes dented with respect to a side to be irradiated by a laser beam for recording and reproducing.

In other words, a groove to be an information track becomes projected into a side to be irradiated by a laser beam for recording and reproducing with respect to the recording type DVD-R disc. However, in the case of the next generation type information recording medium 75, the groove becomes dented with respect to a side to be irradiated by the laser beam.

Inventors of the present invention have actually performed recording and reproducing of such a next generation type information recording medium 75 in high density. The inventors founded a problem such that an output of reproduced signal has decreased and resulted in deterioration of information quality and an error rate of reproduced signal increased when information has been recorded in the concave shaped section "AA", which is a groove of the substrate 71, in comparison with recording and reproducing the convex shaped section "BB", which is a land of the substrate 71.

Further, since an information signal recorded in the concave shaped section "AA" has been deteriorated in quality, recording in high density could not be performed. Such deterioration of quality is supposed to be caused by that a direction of thermal diffusion in the recording layer 72 turns around.

In order to deal with the phenomenon, it is considered that information is recorded on the convex shaped section "BB" as a land and reproduced. However, an address to be reproduced were interfered and resulted in another problem such that accurate address information itself could not be reproduced.

SUMMARY OF THE INVENTION

Accordingly, in consideration of the above-mentioned problems of the prior art, an object of the present invention is to provide an information recording medium and a manufacturing method thereof, wherein an reproduced signal in high output and high quality can be obtained from the information recording medium and address information can be read out accurately from the information recording medium even though the information recording medium is used by irradiating a laser beam on the surface that is opposite to the substrate.

Further, another object of the present invention is to provide a reproducing apparatus and a recording apparatus for recording and reproducing such an information recording medium.

In order to achieve the above object, the present invention provides, according to an aspect thereof, an information recording medium at least comprising: a substrate having a microscopic pattern, which is constituted by a shape of continuous substance of approximately parallel grooves formed with a convex shaped section and a concave shaped section alternately on a surface of the substrate; a recording layer formed on the microscopic pattern; and a light transmitting layer having thickness of 0.05 mm to 0.12 mm formed on the recording layer, the microscopic pattern satisfies a relation of $P \leq \lambda/NA$, wherein P is a pitch of the convex shaped section or the concave shaped section, $\lambda$ is wavelength of reproducing light beam and NA is a numerical aperture of an objective lens, and further the microscopic pattern is characterized in that modulated address information is formed on both side walls of the convex shaped section viewed form the light transmitting layer side as a wobble having same period and phase.

According to another aspect of the present invention, there provided an information recording medium at least comprising: a substrate having a microscopic pattern, which is constituted by a shape of continuous substance of approximately parallel grooves formed with a convex shaped section and a concave shaped section alternately on a surface of the substrate; a recording layer formed on the microscopic pattern; and a light transmitting layer having thickness of 0.05 mm to 0.12 mm formed on the recording layer, the microscopic pattern satisfies a relation of $P \leq \lambda/NA$, wherein P is a pitch of the convex shaped section or the concave shaped section, $\lambda$ is a wavelength of reproducing light beam and NA is a numerical aperture of an objective lens, and further the microscopic pattern is characterized in that a modulated address information is formed on both side walls of the convex shaped section viewed form the light transmitting layer side as a wobble being parallel to each other.

Other object and further features of the present invention will be apparent from the following detailed description when read in conjunction with the accompanying drawings.

DETAILED DESCRIPTION OF THE PREFERRED EMBODIMENTS

First Embodiment

With referring to FIGS. 1 through 31, an embodiment of the present invention will be explained.

Figure 1:
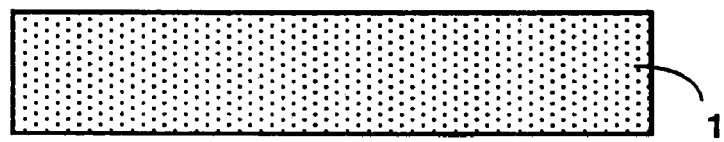
FIG. 1 is a cross sectional view of information recording medium showing a first step (preparing a substrate) of a manufacturing method of information recording medium according to an embodiment of the present invention.

FIG. 1 is a cross sectional view of information recording medium showing a first step (preparing a substrate) of a manufacturing method of information recording medium according to an embodiment of the present invention.

Figure 2:
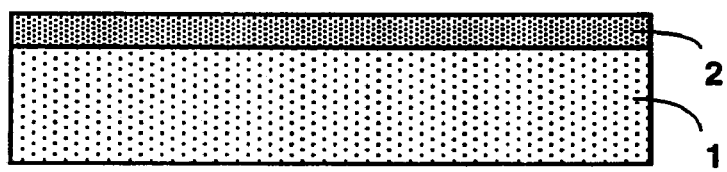
FIG. 2 is a cross sectional view of information recording medium showing a second step (forming an energy ray sensitive film) of the manufacturing method of information recording medium according to the embodiment of the present invention.

FIG. 2 is a cross sectional view of information recording medium showing a second step (forming an energy ray sensitive film) of the manufacturing method of information recording medium according to the embodiment of the present invention.

Figure 3:
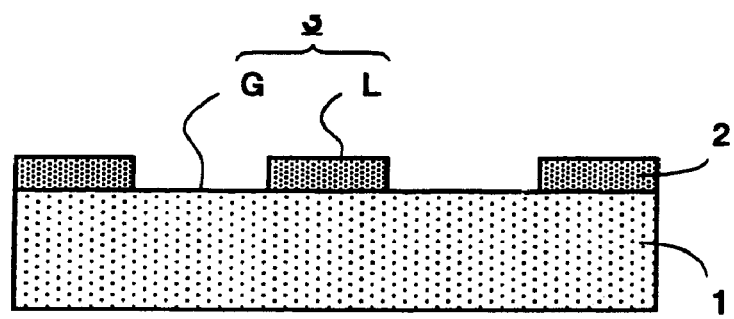
FIG. 3 is a cross sectional view of information recording medium showing a third step (forming a first microscopic pattern) of the manufacturing method of information recording medium according to the embodiment of the present invention.

FIG. 3 is a cross sectional view of information recording medium showing a third step (forming a first microscopic pattern) of the manufacturing method of information recording medium according to the embodiment of the present invention.

Figure 4:
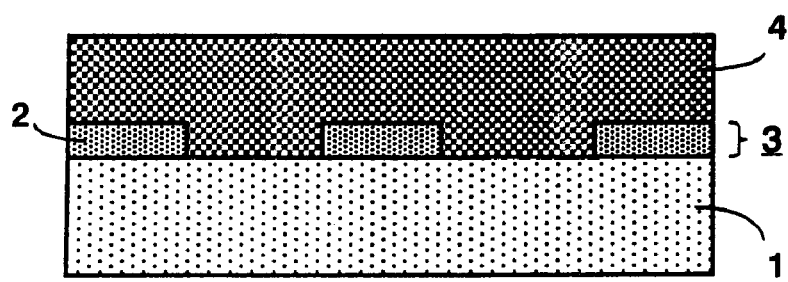
FIG. 4 is a cross sectional view of information recording medium showing a fourth step (forming a first plating layer) of the manufacturing method of information recording medium according to the embodiment of the present invention.

FIG. 4 is a cross sectional view of information recording medium showing a fourth step (forming a first plating layer) of the manufacturing method of information recording medium according to the embodiment of the present invention.

Figure 5:
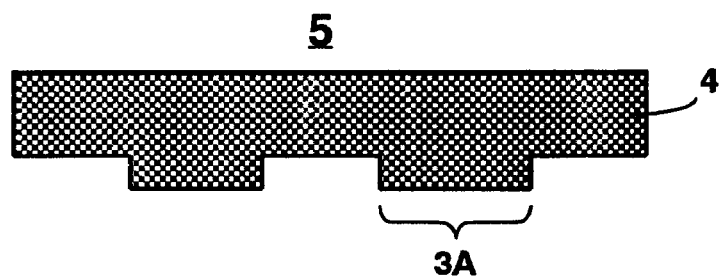
FIG. 5 is a cross sectional view of information recording medium showing a fifth step (producing a first plating die) of the manufacturing method of information recording medium according to the embodiment of the present invention.

FIG. 5 is a cross sectional view of information recording medium showing a fifth step (producing a first plating die) of the manufacturing method of information recording medium according to the embodiment of the present invention.

Figure 6:
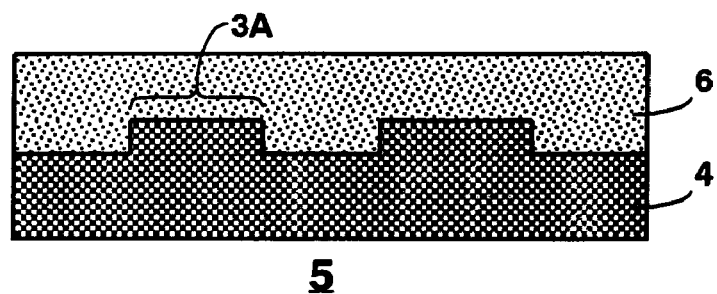
FIG. 6 is a cross sectional view of information recording medium showing a sixth step (forming a second plating layer) of the manufacturing method of information recording medium according to the embodiment of the present invention.

FIG. 6 is a cross sectional view of information recording medium showing a sixth step (forming a second plating layer) of the manufacturing method of information recording medium according to the embodiment of the present invention.

Figure 7:
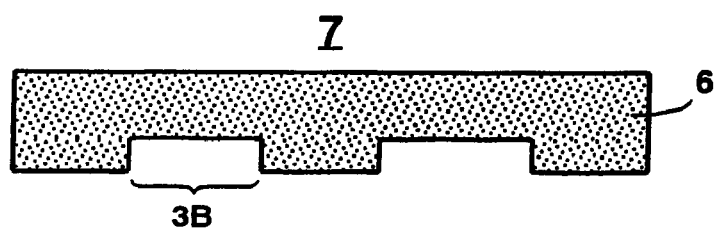
FIG. 7 is a cross sectional view of information recording medium showing a seventh step (producing a second plating die) of the manufacturing method of information recording medium according to the embodiment of the present invention.

FIG. 7 is a cross sectional view of information recording medium showing a seventh step (producing a second plating die) of the manufacturing method of information recording medium according to the embodiment of the present invention.

Figure 8:
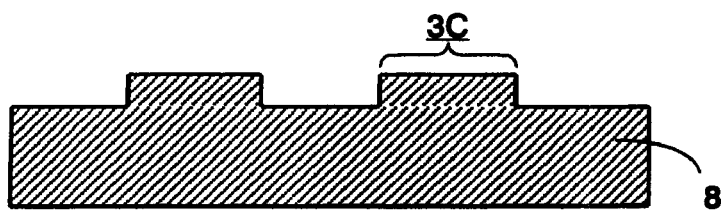
FIG. 8 is a cross sectional view of information recording medium showing an eighth step (producing a substrate) of the manufacturing method of information recording medium according to the embodiment of the present invention.

FIG. 8 is a cross sectional view of information recording medium showing an eighth step (producing a substrate) of the manufacturing method of information recording medium according to the embodiment of the present invention.

Figure 9:
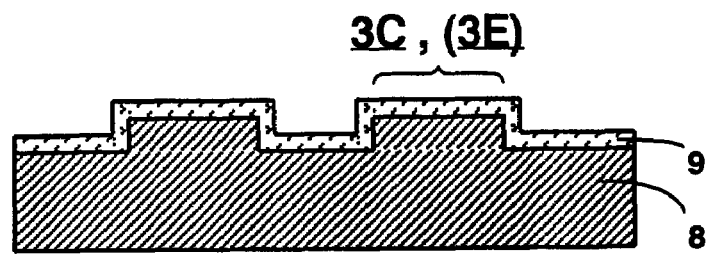
FIG. 9 is a cross sectional view of information recording medium showing a ninth step (forming a recording layer) of the manufacturing method of information recording medium according to the embodiment of the present invention.

FIG. 9 is a cross sectional view of information recording medium showing a ninth step (forming a recording layer) of the manufacturing method of information recording medium according to the embodiment of the present invention.

Figure 10:
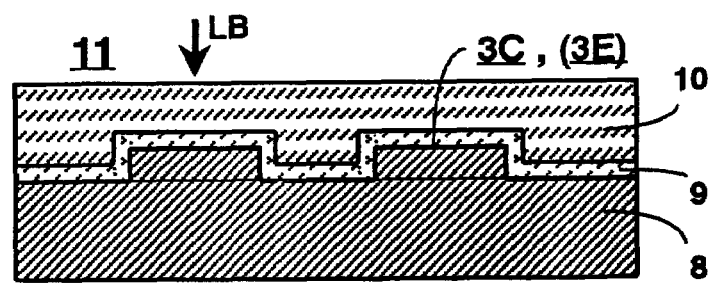
FIG. 10 is a cross sectional view of an information recording medium manufactured by the manufacturing method shown in FIGS. 1 through 9.

FIG. 10 is a cross sectional view of an information recording medium manufactured by the manufacturing method shown in FIGS. 1 through 9.

Figure 11:
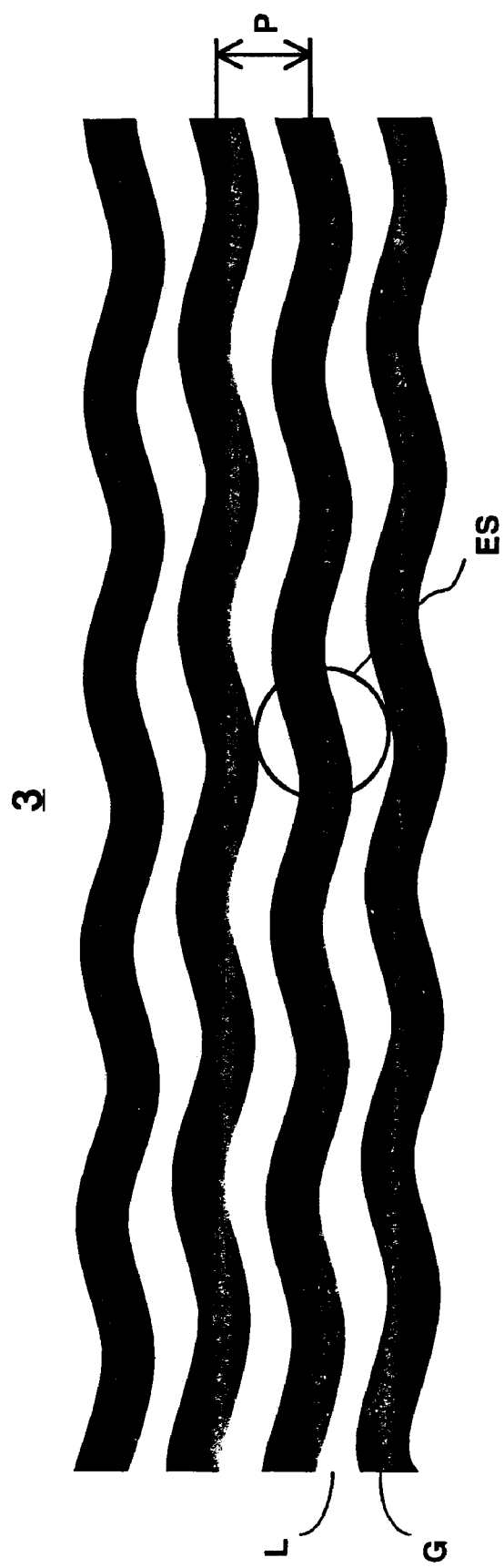
FIG. 11 is a plan view, partially enlarged, of the information recording medium shown in FIG. 10.

FIG. 11 is a plan view, partially enlarged, of the information recording medium shown in FIG. 10.

Figure 12:
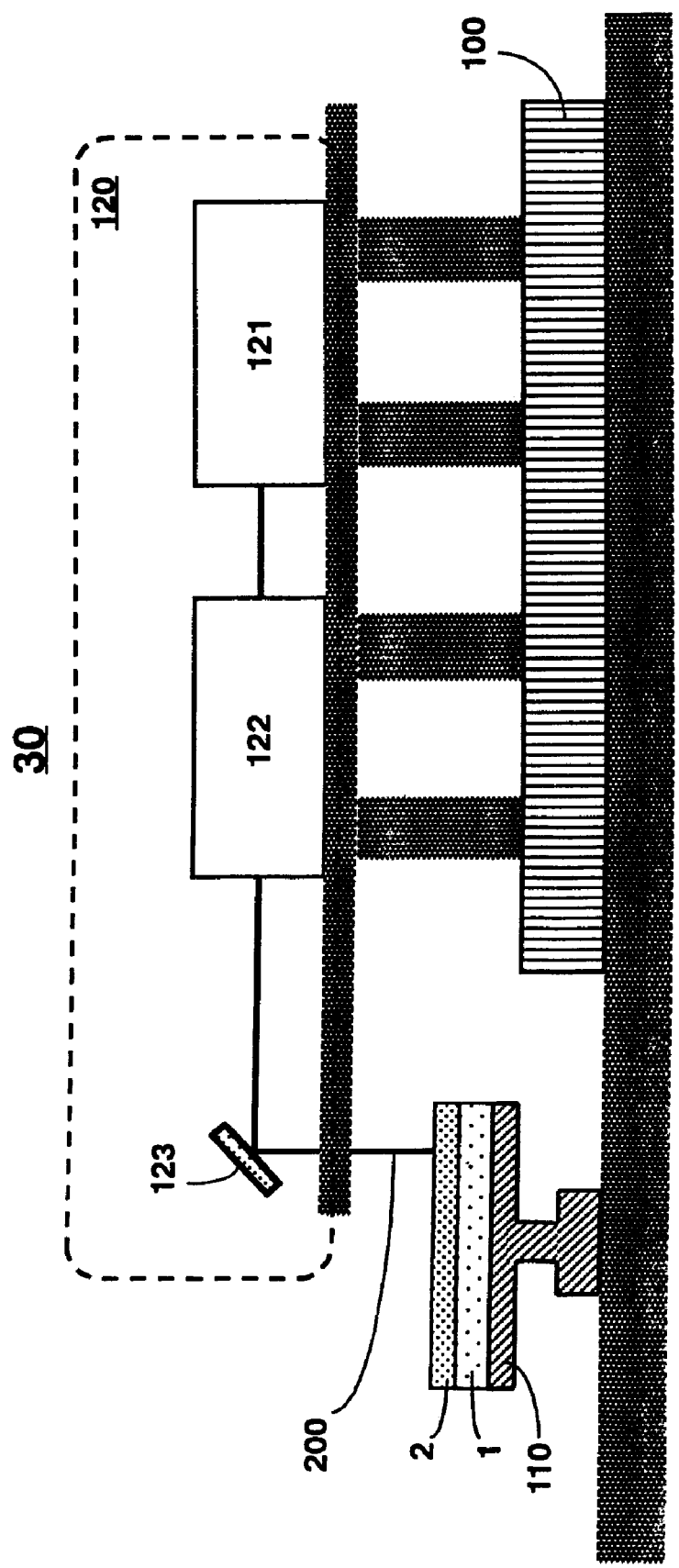
FIG. 12 is a cross sectional side view of a first energy ray radiating apparatus for recording a microscopic pattern on an information recording medium according to the present invention.

FIG. 12 is a cross sectional side view of a first energy ray radiating apparatus for recording a microscopic pattern on an information recording medium according to the present invention.

Figure 13:
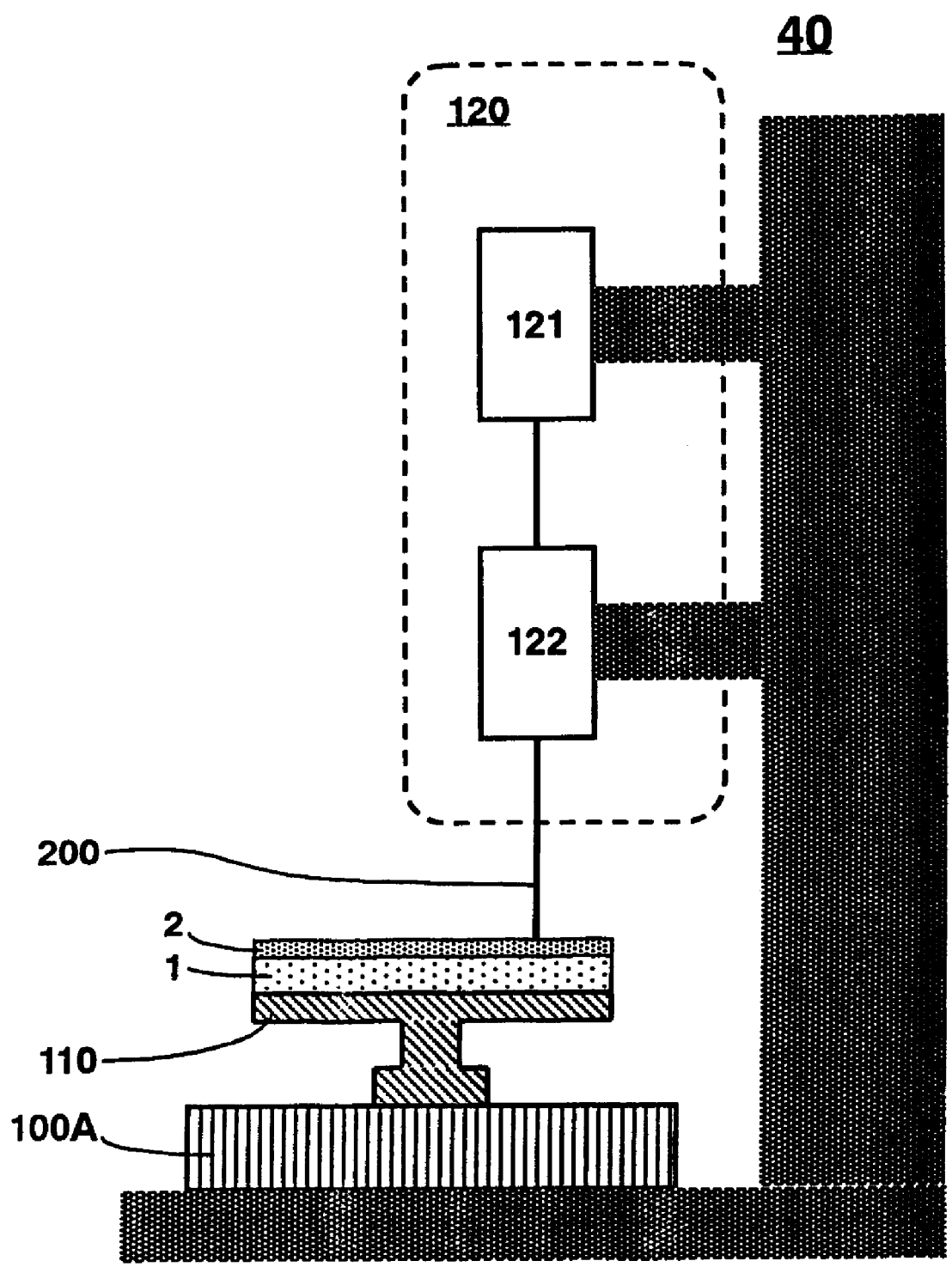
FIG. 13 is a cross sectional side view of a second energy ray radiating apparatus for recording a microscopic pattern on an information recording medium according to the present invention.

FIG. 13 is a cross sectional side view of a second energy ray radiating apparatus for recording a microscopic pattern on an information recording medium according to the present invention.

Figure 14:
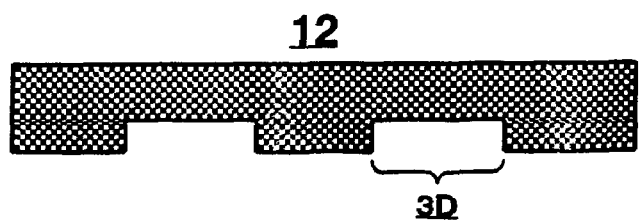
FIG. 14 is a cross sectional view of a negative type energy ray sensitive film in a producing process of a plated die in a negative type according to the embodiment of the present invention.

FIG. 14 is a cross sectional view of a negative type energy ray sensitive film in a producing process of a plated die in a negative type according to the embodiment of the present invention.

Figure 15:
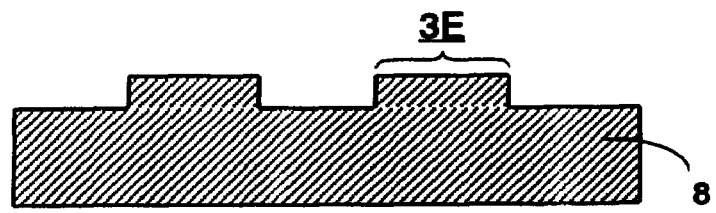
FIG. 15 is a cross sectional view of a negative type substrate in a forming process of negative type substrate according to the embodiment of the present invention.

FIG. 15 is a cross sectional view of a negative type substrate in a forming process of negative type substrate according to the embodiment of the present invention.

Figure 16:
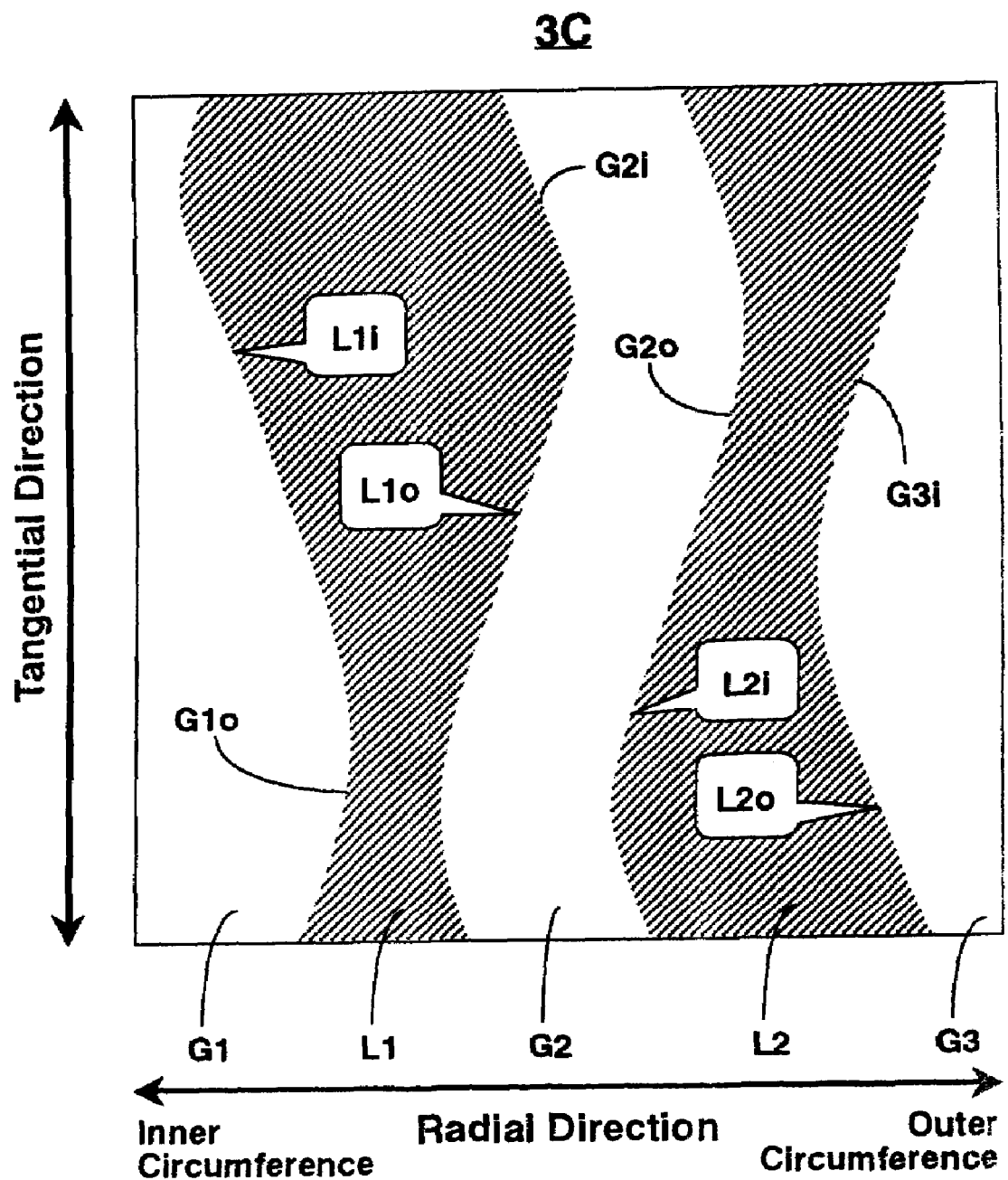
FIG. 16 is a fragmentary plan view, partially enlarged, of a microscopic pattern formed on an information recording medium, which is manufactured by the manufacturing method of information recording medium according to embodiment of the present invention.

FIG. 16 is a fragmentary plan view, partially enlarged, of a microscopic pattern formed on an information recording medium, which is manufactured by the manufacturing method of information recording medium according to embodiment of the present invention.

Figure 17:
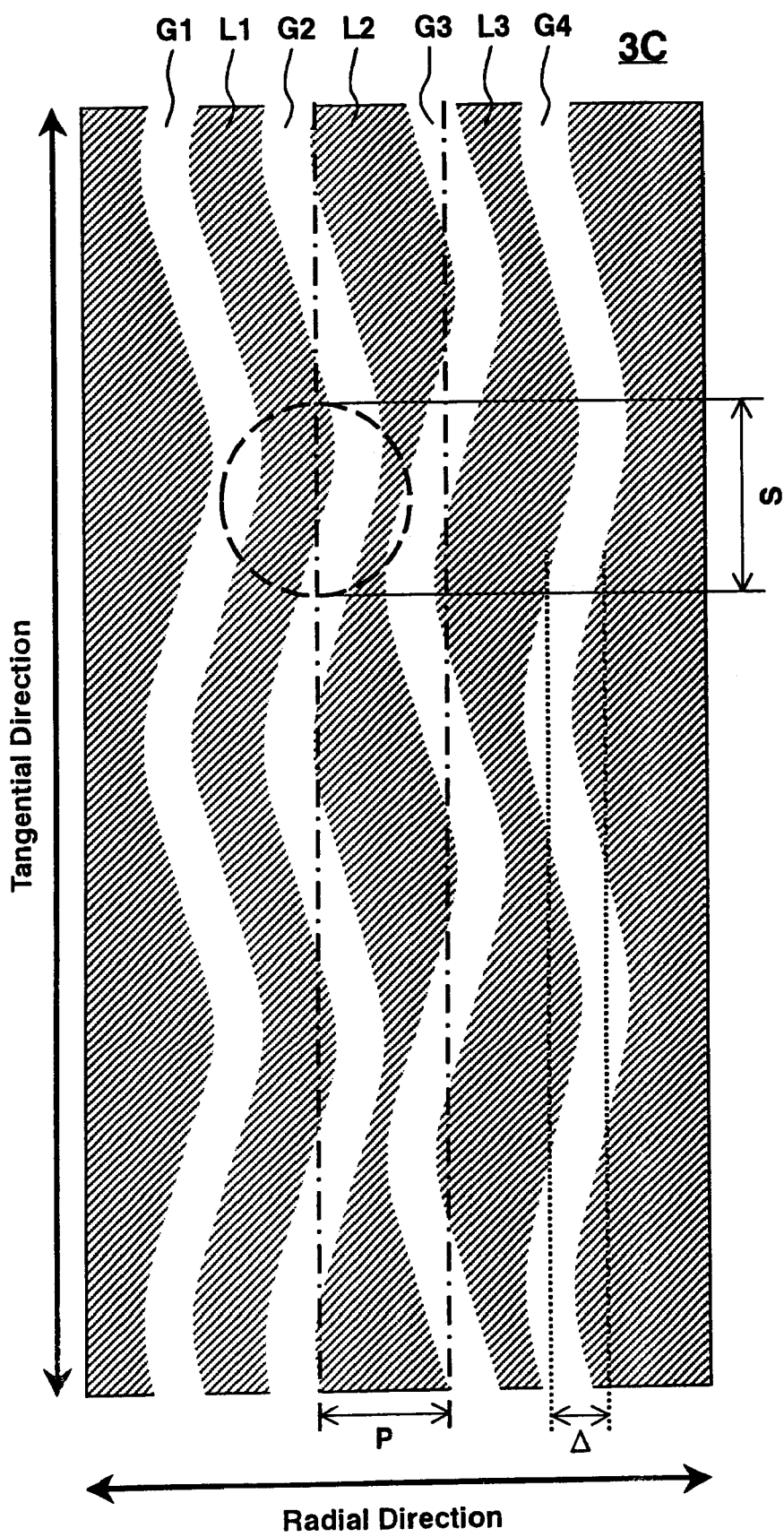
FIG. 17 is a fragmentary plan view, partially enlarged, of an information recording medium, which is suitable for a CLV (Continuous Linear Velocity) recording in a disc shape, according to the present invention.

FIG. 17 is a fragmentary plan view, partially enlarged, of an information recording medium, which is suitable for a CLV (Continuous Linear Velocity) recording in a disc shape, according to the present invention.

Figure 18:
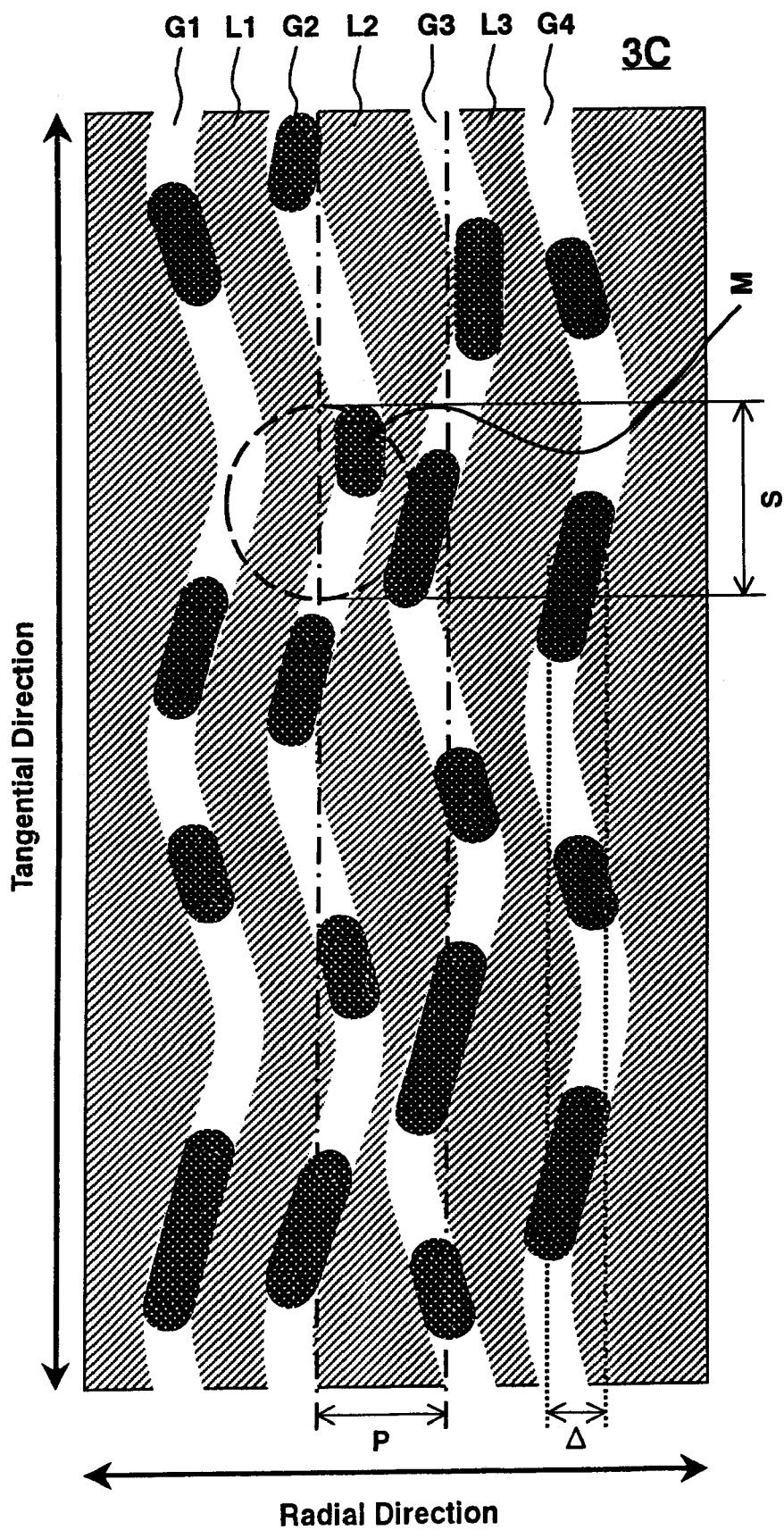
FIG. 18 is a fragmentary plan view, partially enlarged, of an information recording medium, which is suitable for a CLV recording in a disc shape and recorded by a user, according to the present invention.

FIG. 18 is a fragmentary plan view, partially enlarged, of an information recording medium, which is suitable for a CLV recording in a disc shape and recorded by a user, according to the present invention.

Figure 19:
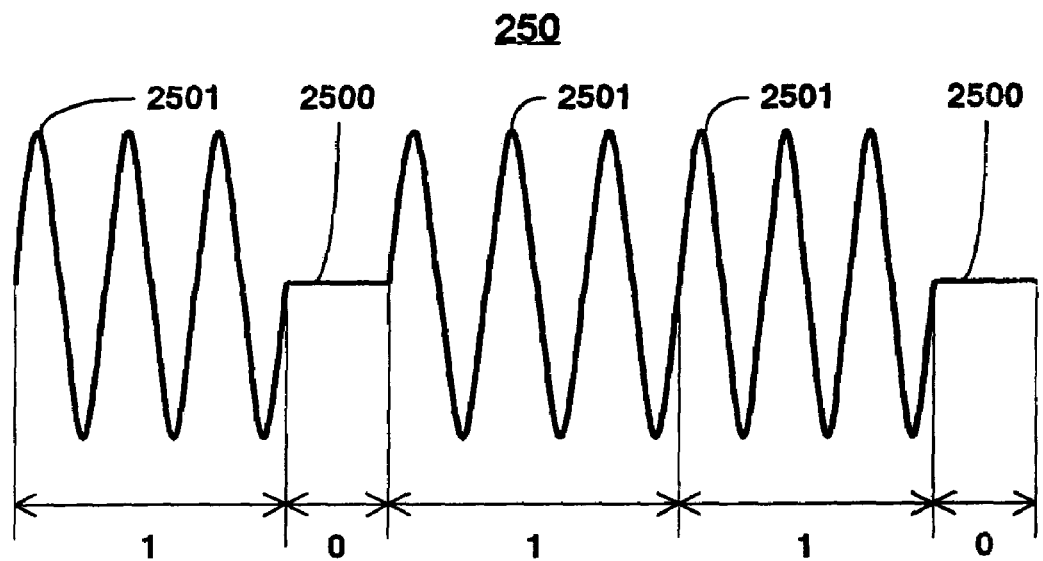
FIG. 19 shows a first amplitude-shift keying modulation waveform recorded on a fourth microscopic pattern.

FIG. 19 shows a first amplitude-shift keying modulation waveform recorded on a fourth microscopic pattern.

Figure 20:
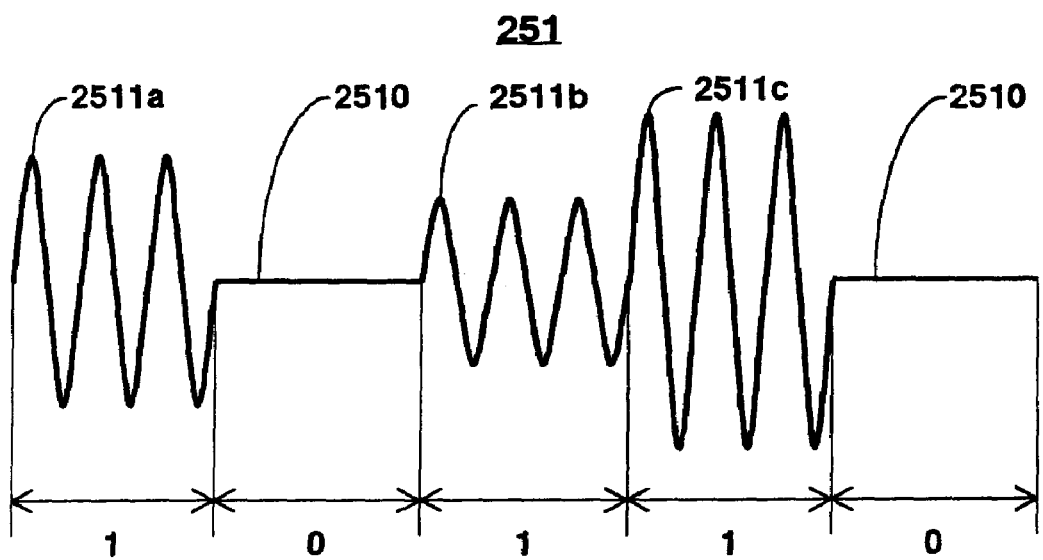
FIG. 20 shows a second amplitude-shift keying modulation waveform recorded on a fourth microscopic pattern.

FIG. 20 shows a second amplitude-shift keying modulation waveform recorded on a fourth microscopic pattern.

Figure 21:
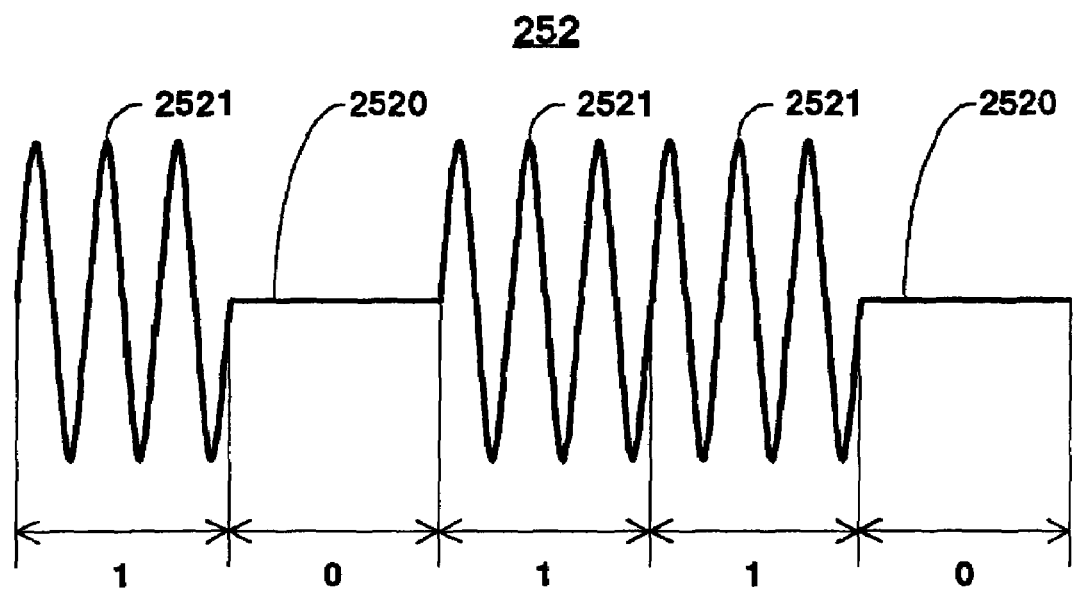
FIG. 21 shows a third amplitude-shift keying modulation waveform recorded on a fourth microscopic pattern.

FIG. 21 shows a third amplitude-shift keying modulation waveform recorded on a fourth microscopic pattern.

Figure 22:
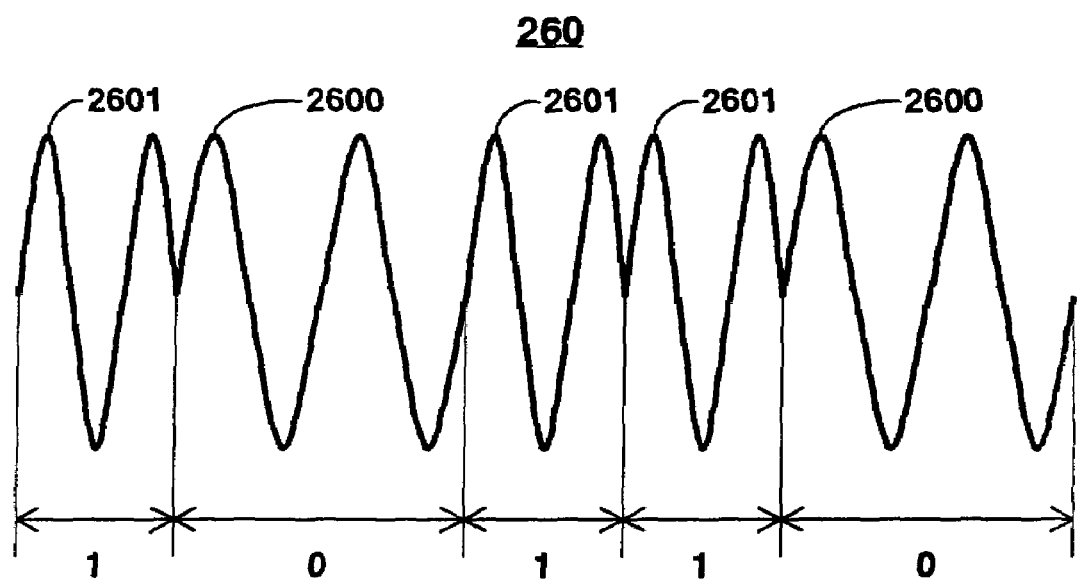
FIG. 22 shows a first frequency-shift keying modulation waveform recorded on a fourth microscopic pattern.

FIG. 22 shows a first frequency-shift keying modulation waveform recorded on a fourth microscopic pattern.

Figure 23:
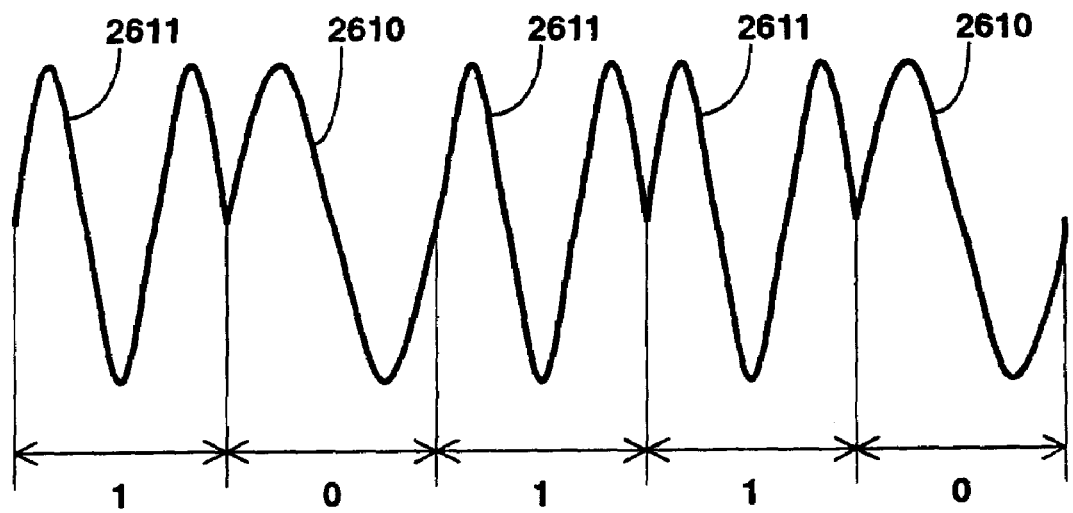
FIG. 23 shows a second frequency-shift keying modulation waveform recorded on a fourth microscopic pattern.

FIG. 23 shows a second frequency-shift keying modulation waveform recorded on a fourth microscopic pattern.

Figure 24:
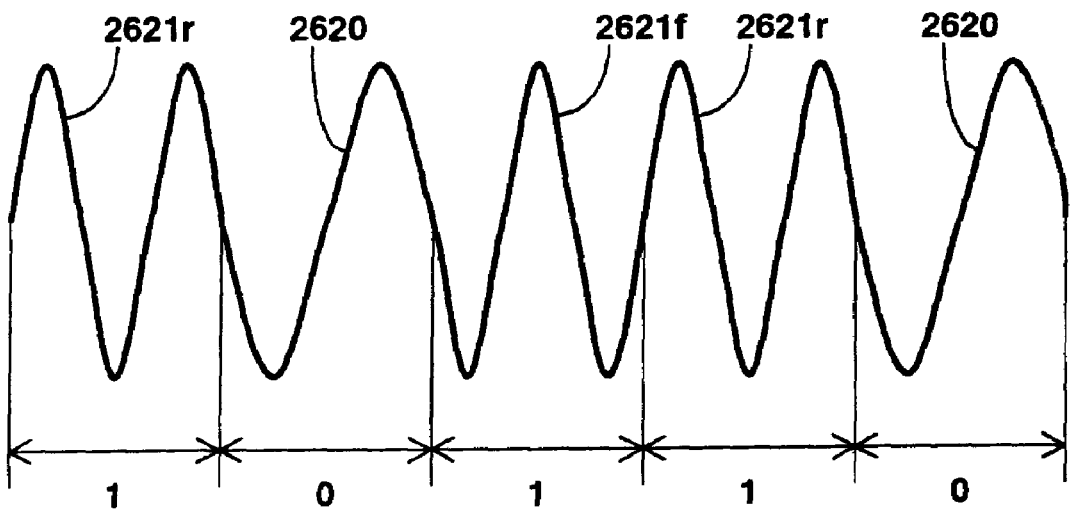
FIG. 24 shows a third frequency-shift keying modulation waveform recorded on a fourth microscopic pattern.

FIG. 24 shows a third frequency-shift keying modulation waveform recorded on a fourth microscopic pattern.

Figure 25:
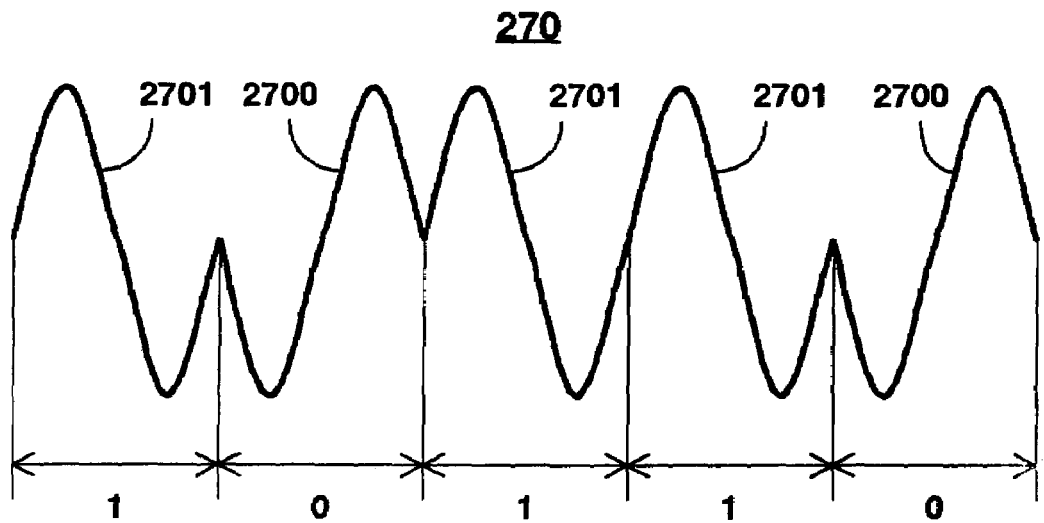
FIG. 25 shows a first phase-shift keying modulation waveform recorded on a fourth microscopic pattern.

FIG. 25 shows a first phase-shift keying modulation waveform recorded on a fourth microscopic pattern.

Figure 26:
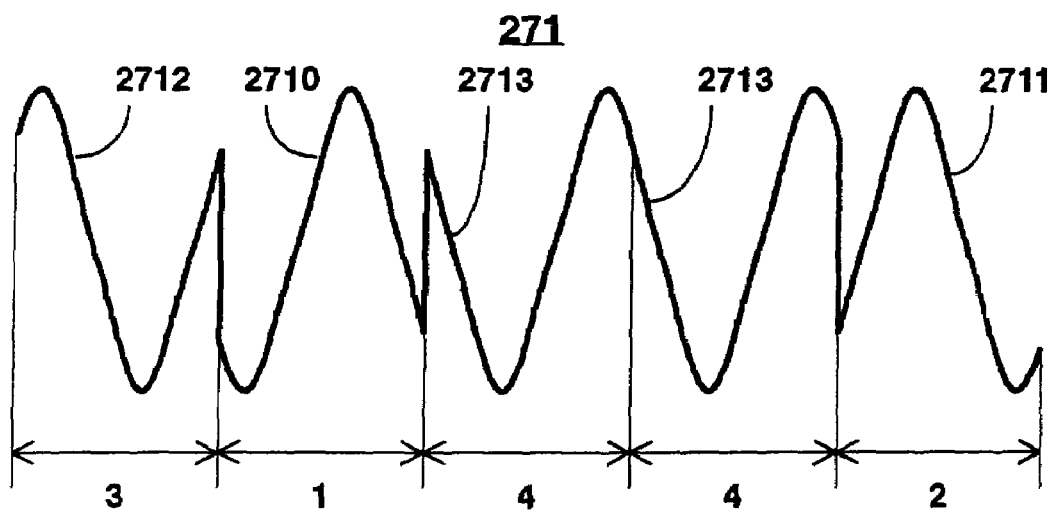
FIG. 26 shows a second phase-shift keying modulation waveform recorded on a fourth microscopic pattern.

FIG. 26 shows a second phase-shift keying modulation waveform recorded on a fourth microscopic pattern.

Figure 27:
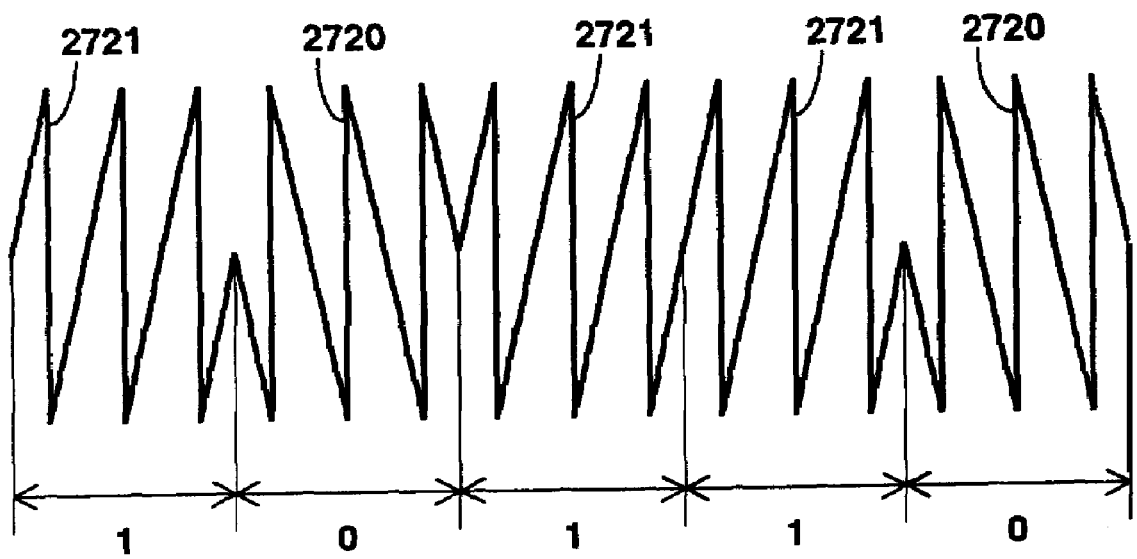
FIG. 27 shows a third phase-shift keying modulation waveform recorded on a fourth microscopic pattern.

FIG. 27 shows a third phase-shift keying modulation waveform recorded on a fourth microscopic pattern.

Figure 28:
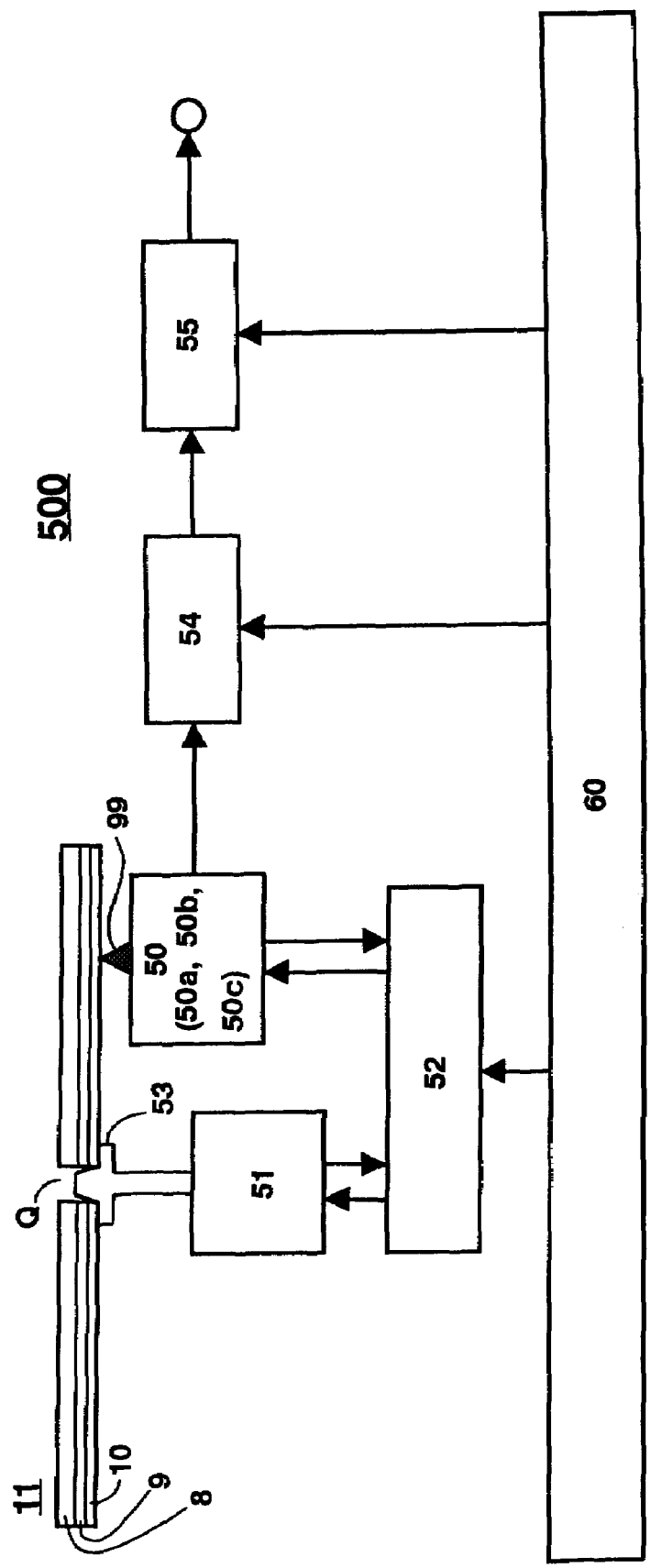
FIG. 28 is a block diagram of a first reproducing apparatus according to the embodiment of the present invention.

FIG. 28 is a block diagram of a first reproducing apparatus according to the embodiment of the present invention.

Figure 29:
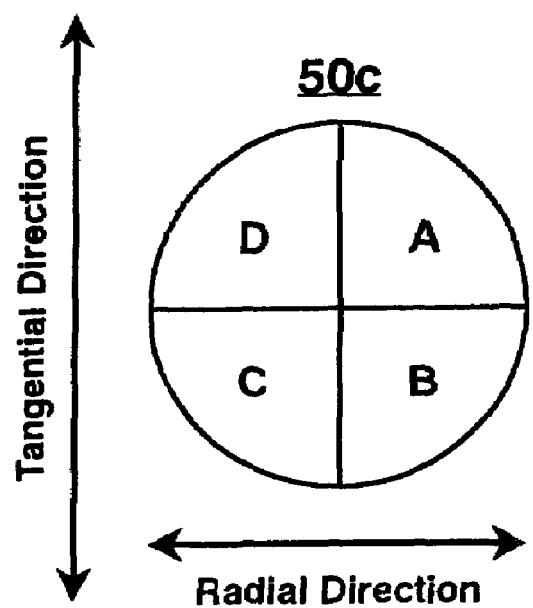
FIG. 29 is a plan view of a photo detector installed in the reproducing apparatus shown in FIG. 28.

FIG. 29 is a plan view of a photo detector installed in the reproducing apparatus shown in FIG. 28.

Figure 30:
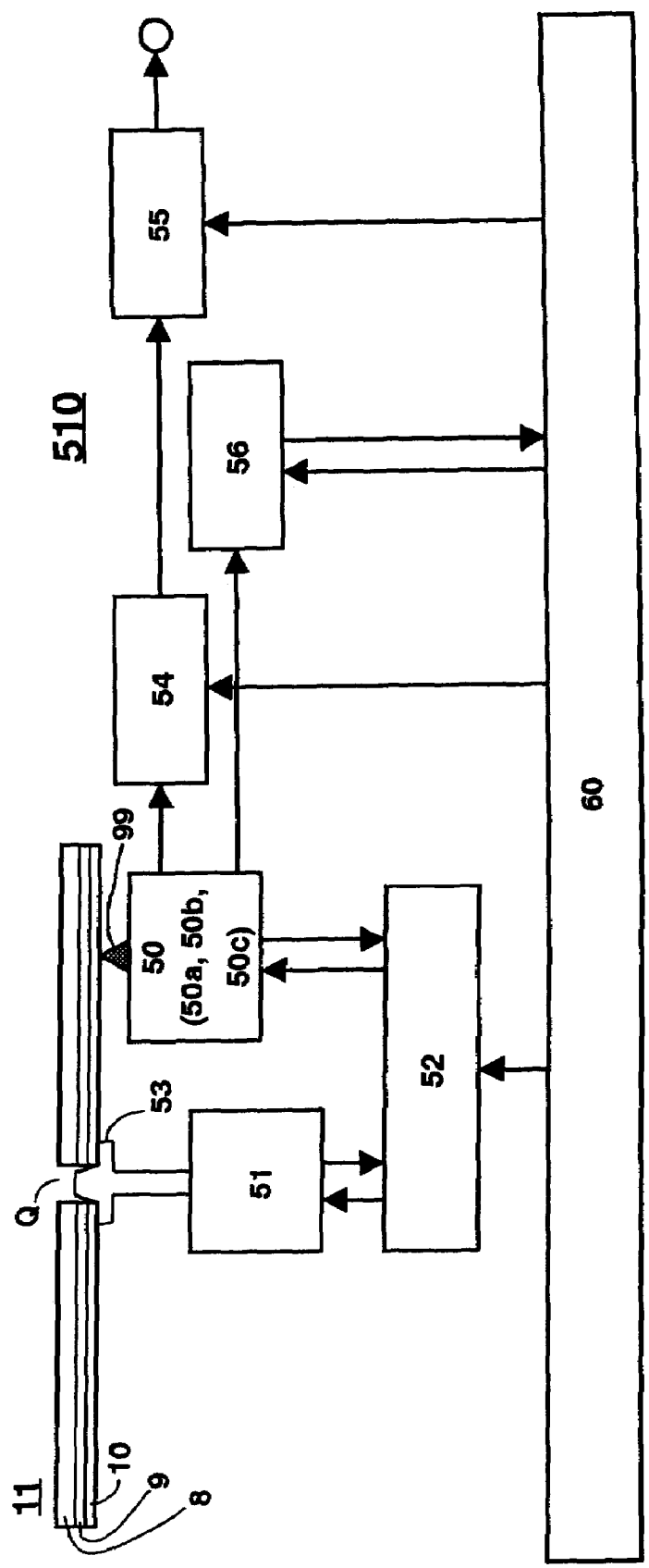
FIG. 30 is a block diagram of a second reproducing apparatus according to the embodiment of the present invention.

FIG. 30 is a block diagram of a second reproducing apparatus according to the embodiment of the present invention.

Figure 31:
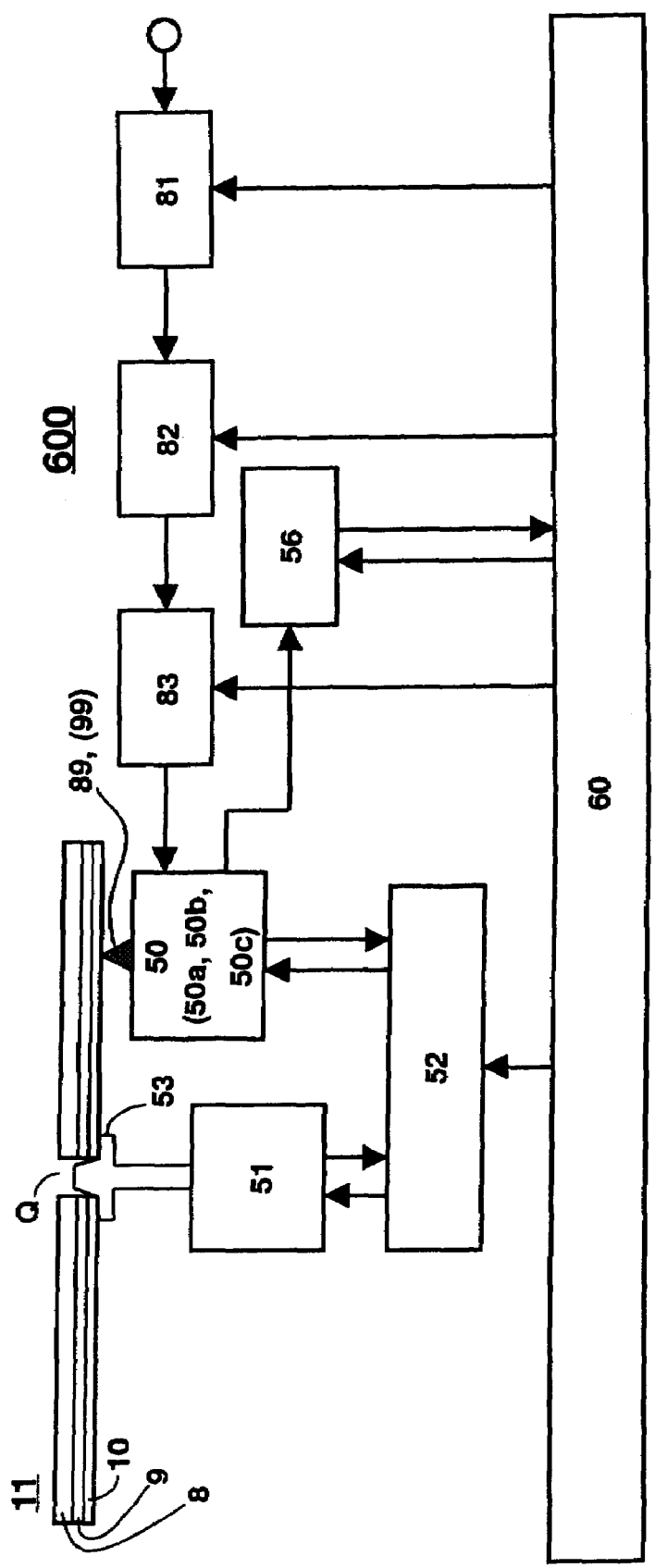
FIG. 31 is a block diagram of a recording apparatus according to the embodiment of the present invention.
Figure 32:
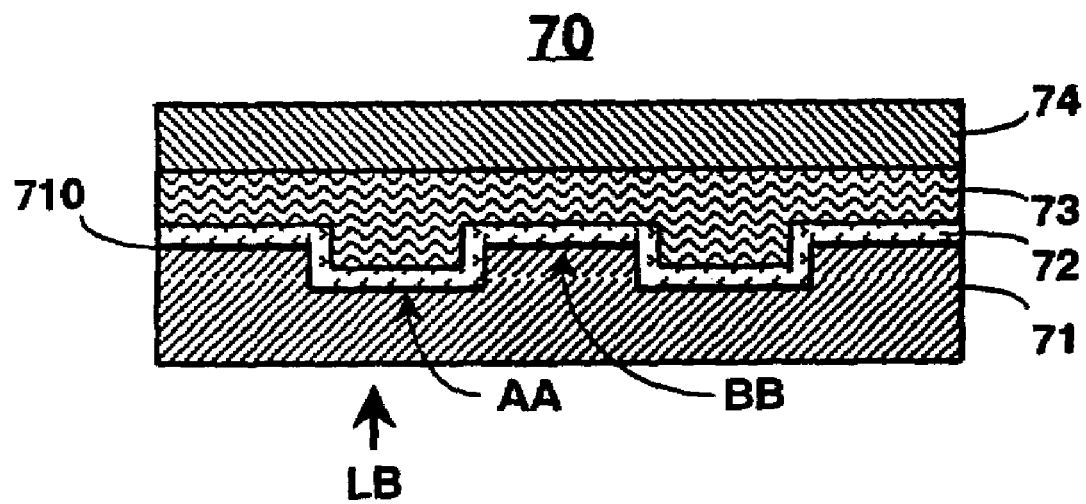
FIG. 32 is a cross sectional view of a conventional recording type DVD-R disc.
Figure 33:
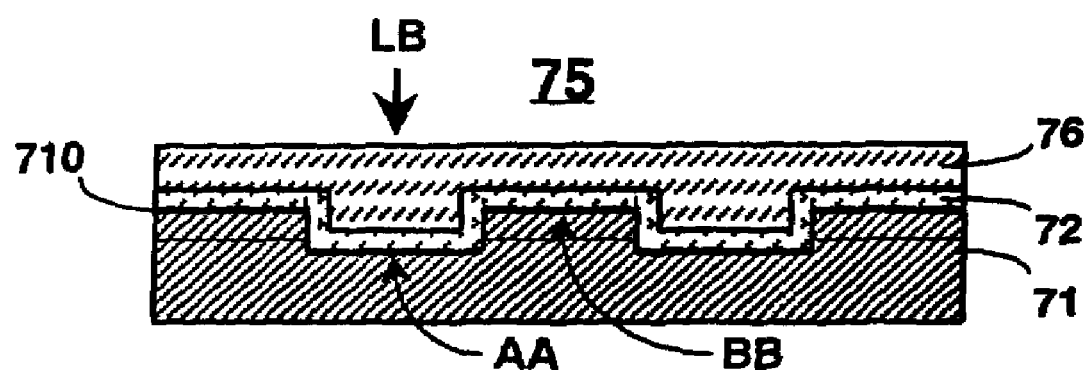
FIG. 33 is a cross sectional view of a next generation type information recording medium having higher density than a current DVD disc.

FIG. 31 is a block diagram of a recording apparatus according to the embodiment of the present invention.

(Process for Preparing Flat Substrate)

As shown in FIG. 1, a flat substrate 1 is prepared for a first step of manufacturing an information recording medium according to the present invention.

The flat substrate 1 is finished in flat as fine as the optical grade and selected out of a ceramic substrate such as silicon oxide, non-alkali glass and 7913 glass, and a metal substrate having silicon, molybdenum, tungsten or their alloy (including alloy oxide, nitride or carbide) on the surface of the metal substrate.

(Process for Forming Energy Ray Sensitive Film)

As shown in FIG. 2, a positive type energy ray sensitive film 2 is coated on one surface of the flat substrate 1.

The positive type energy ray sensitive film 2 is a material having a characteristic such as decomposing or polymerizing when irradiated with an energy ray. It is applicable for the decomposing process to be composed of either one step or a plurality of steps (for example, two or three steps, or more steps).

The decomposing process of the positive type energy ray sensitive film 2 by one through three steps or more steps is explained next.

With respect to a typical example of decomposing process by one step, in a case that an energy ray is deep-ultraviolet radiation in high illuminance, resin such as polycarbonate resin and polystyrene resin can be used for the positive type energy ray sensitive film 2 and formed with a hole by sublimation or explosion phenomenon on a surface of the resin.

Further, as another example of decomposing process by one step, in a case that an energy ray is ultraviolet radiation represented by the "g-line" ray (having a wavelength of 436 nm) in high illuminance or deep-ultraviolet radiation having a shorter wavelength than 436 nm, a thin film such as tellurium oxide thin film, vanadium oxide thin film, molybdenum oxide thin film, yttrium oxide thin film, palladium oxide thin film, silver oxide thin film, tungsten oxide thin film and zinc oxide thin film can be used for the positive type energy ray sensitive film 2 and can be formed with a hole by sublimating a surface of thin film.

With respect to a typical example of decomposing process by two steps, in a case that an energy ray is ultraviolet radiation, a film formed with a mixed material of cresol novolac resin and naphthoquinone diazide can be used for the positive type energy ray sensitive film 2. By irradiating the energy ray on the surface of the film, naphthoquinone diazide decomposes chemically and releases cresol novolac resin from insolubility. At this moment, the film has no hole on the surface. However, letting alkaline development solution flow on the surface of the film solves an irradiated portion of the film. Consequently, a hole can be formed on the surface of the film.

With respect to a typical example of decomposing process by three steps, in a case that an energy ray is deep-ultraviolet radiation or an electron beam, a film, which is at least composed of polyhydroxy styrene resin and acid generating agent such as onium salt, can be used for the positive type energy ray sensitive film 2. By irradiating an energy ray on the surface of the film, acid generating agent decomposes chemically and generates acid. At this moment, the film has no hole on the surface. However, upon being heated, the acid diffuses throughout the film and the polyhydroxy styrene resin is decomposed. Then, letting alkaline development solution flow on the surface of the film solves an irradiated portion of the film. Consequently, a hole can be formed on the surface of the film.

In addition thereto, a negative type energy ray sensitive film of which a portion influenced by converged energy ray becomes insoluble can be used in stead of a positive type energy ray sensitive film 2. In a case of using a negative type energy ray sensitive film, by increasing or decreasing a number of plating processes by one step, unlike a positive type energy ray sensitive film, such a negative type energy ray sensitive film can comply with the manufacturing method of the present invention. A manufacturing method that uses a negative type energy ray sensitive film as the energy ray sensitive film 2 will be depicted later.

(Process for Forming Microscopic Pattern)

In FIG. 3, by using an energy ray radiating apparatus 30 or 40 shown in FIG. 12 or 13, a converged energy ray, which is controlled by a processor (not shown), is irradiated on the positive type energy ray sensitive film 2. As shown in FIG. 3, a groove "G" having an address wobble and a land "L" are formed and then, a first microscopic pattern 3 shown in FIGS. 3 and 11 is formed. While forming the first microscopic pattern 3, both sides of the groove "G" is formed so as to be equal to each other in wobbling period and phase.

Actually, the groove "G" of the first microscopic pattern 3 is formed by swinging the converged energy ray right and left or by changing irradiation strength of the converged energy ray in conjunction with swinging it right and left in accordance with address information. The right and left mentioned above is a direction that is at right angle to a progressing direction of the groove "G". In other words, the direction of right and left is a direction that intersects perpendicularly to a track direction. In a case that an information recording medium 11 shown in FIG. 10, which is manufactured by transferring the first microscopic pattern 3, is in disciform, for example, the direction of right and left is a radial direction of the information recording medium 11. The information recording medium 11 itself will be detailed later.

A portion, which is irradiated with a converged energy ray, on the energy ray sensitive film 2 is hereinafter referred to as a groove "G".

With referring to FIGS. 12 and 13, first and second energy ray radiating apparatuses 30 and 40 are explained next.

FIG. 12 is a cross sectional side view of a first energy ray radiating apparatus for recording a microscopic pattern on an information recording medium according to the present invention.

As shown in FIG. 12, the first energy ray radiating apparatus 30 is composed of a flat substrate supporting unit 110, which supports the flat substrate 1 formed with the energy ray sensitive film 2, an energy ray radiating unit 120 and a relative motion supplying unit 100.

The flat substrate supporting unit 110 is a unit that can support the flat substrate 1 having the energy ray sensitive film 2 at least during a period of time while recording by irradiating an energy ray. Actually, such a unit is equivalent to a table, which is polished in higher accuracy and equipped with fixing mechanism (such as screwing, vacuum suction and electrostatic suction) so as to install the flat substrate 1.

The energy ray radiating unit 120 is further composed of an energy ray source 121, which radiates an energy ray, a beam shaper 122, which shapes the energy ray in a beam shape suitable for information recording by signal modulation and resulted in a converged energy ray 200, and a reflecting mirror 123 that conducts the converged energy ray 200, which is signal modulated by the beam shaper 122, to the flat substrate 1 formed with the energy ray sensitive film 2 that is installed on the flat substrate supporting unit 110. Further, a processor (not shown), which generates and transmits a modulation signal in accordance with address information, is connected to the beam shaper 122. In this constitution, a lens (not shown) can be install between the flat substrate supporting unit 110 and the reflecting mirror 123 so as to converge the energy ray.

The energy ray source 121 radiates an electromagnetic wave having a wavelength of 10 nm to 1500 nm (such as γ-ray, X-rays, extremely deep-ultraviolet, deep-ultraviolet, ultraviolet, visible radiation and infrared radiation) and a particle beam (such as α-ray, β-ray, proton beam, neutron beam and electron beam).

As an actual example of the energy ray source 121, there is existed a radiating apparatus that radiates a wide range of energy rays covering from ultraviolet to deep-ultraviolet having a wavelength (such as 364 nm, 355 nm, 351 nm, 325 nm, 275 nm, 266 nm, 257 nm, 248 nm and 244 nm).

With respect to an actual example of the beam shaper 122, there is existed an electrooptical deflection apparatus (EOD) by an electrooptical crystal element and an acoustooptic deflection apparatus (AOD) by acoustooptic crystal element. Further, in a case that the energy ray source 121 is a radiating apparatus, which radiates an electron beam, the beam shaper 122 is defined to be a blanking electrode and a beam deflection apparatus.

The reflecting mirror 123 is provided for conducting the converged energy ray 200 to the flat substrate 1, which is formed with the energy ray sensitive film 2. Therefore, if the energy ray radiating unit 120 is in a constitution such that the converged energy ray 200 can be irradiated on the flat substrate 1 having the energy ray sensitive film directly, the reflecting mirror 123 is not necessary for the first energy ray radiating apparatus 30.

A circuit, which can delay, reduce or expand a time period between receiving and transmitting address information, can be built in a processor (not shown) or installed between the processor and the beam shaper 122 in accordance with necessity.

The relative motion supplying unit 100 is composed of a motor and linear driving mechanism and can perform various movements such as rotating, X-axis directional moving, Y-axis directional moving and Z-axis directional moving or combined movement of them.

By installing a position monitor in accordance with necessity, the relative motion supplying unit 100 can be controlled according to a monitored position. Further, the relative motion supplying unit 100 is allocated on either one side of the energy ray radiating unit 120 and the flat substrate supporting unit 110, or both sides of them. In this embodiment, the relative motion supplying unit 100 is allocated on the side of the energy ray radiating unit 120 and moves the energy ray radiating unit 120 relatively.

With referring to FIG. 13, a second energy ray radiating apparatus 40 is explained next.

FIG. 13 is a cross sectional side view of the second energy ray radiating apparatus 40 for recording a microscopic pattern on an information recording medium according to the present invention.

In FIG. 13, the second energy ray radiating apparatus 40 is in a constitution that a relative motion supplying unit 100A, which is equivalent to the relative motion supplying unit 100 of the first energy ray radiating apparatus 30, is disposed under the flat substrate supporting unit 110. The flat substrate 1 formed with the energy ray sensitive film 2 is moved relatively by the relative motion supplying unit 100A.

By using the first and second energy ray radiating apparatuses 30 and 40, an actual forming method of the first microscopic pattern 3 shown in FIGS. 3 and 11 by a spot "ES" of the converged energy ray 200 is detailed next.

In a case that the first energy ray radiating apparatus 30 is used, the flat substrate 1 formed with the energy ray sensitive film 2 is installed on the flat substrate supporting unit 110. A groove "G" having an address wobble, which is composed of a concave section, is formed on the flat substrate 1 by irradiating the converged energy ray 200 on the positive type energy ray sensitive film 2 while the flat substrate 1 is moved relatively, wherein the converged energy ray 200 is radiated by the energy ray source 121 in the energy ray radiating unit 120 and is signal modulated by the beam shaper 122, and then reflected by the reflecting mirror 123.

Forming the groove "G" is realized by utilizing interaction between the positive type energy ray sensitive film 2 and the converged energy ray 200.

In other words, by irradiating the spot "ES" of the converged energy ray 200 (hereinafter simply referred to as spot "ES") on the positive type energy ray sensitive film 2, the first microscopic pattern 3 that is formed with the groove "G" having a plurality of address wobbles and the land "L", which is adjacent to the groove "G", can be obtained. As mentioned above, the groove "G" is a concave shaped section and the land "L" is a convex shaped section.

Further, a decomposition process of the positive type energy ray sensitive film 2 can be evolved by one step or a plurality of steps. Therefore, in a case of using the positive type energy ray sensitive film 2 in one step, the first microscopic pattern 3 is formed immediately after the converged energy ray 200 is irradiated on the positive type energy ray sensitive film 3. On the contrary, in a case of the plurality of steps, by processing predetermined treatment (for example, in a case of two steps, the treatment is an alkaline developing treatment, and in a case of three steps, it is heating and alkaline developing treatment), the first microscopic pattern 3 that is composed of the groove "G" and the land "L", which are alternately repeated, can be obtained.

Furthermore, in a case of forming the groove "G" linearly, as mentioned above, it is realized by moving either one of the flat substrate supporting unit 110 and the energy ray radiating unit 120. More, by using relative motion between the flat substrate supporting unit 110 and the energy ray radiating unit 120, a uniform track pitch "P" can also be maintained.

While forming the groove "G" linearly, an address wobble is actually formed by swinging the position to be continuously irradiated with the converged energy ray 200 right and left. As mentioned above, the "right and left" is a direction that is at right angle to a progressing direction of the groove "G". In other words, the direction of "right and left" is a direction that intersects perpendicularly to a track direction.

In a surrounding area of the converged energy ray 200 that is irradiated, a position perpendicular to the progressing direction of the groove "G" is corresponding to both sides of the groove "G" to be formed. Therefore, by swinging the converged energy ray 200 to the direction that is at right angle to the progressing direction of the groove "G", both sides of the groove "G" wobble and a wobbling groove "G" in uniform period and phase is formed. The wobbling groove "G" is in uniform period and phase, so that both sides of the groove "G" that is formed in the first microscopic pattern 3 are always in parallel to each other.

In addition thereto, the wobbling groove "G" can be formed by changing irradiating strength of the converged energy ray 200 in conjunction with swinging the converged energy ray 200 right and left. The timing of changing and swinging the converged energy ray 200 can be controlled by an address information controlling mechanism (not shown). For example, irradiating the converged energy ray 200 while address information is ON forms a groove "G" having an address wobble in the energy ray sensitive film 2 on the flat substrate 1.

In a case of using the second energy radiating apparatus 40, the first microscopic pattern 3 shown in FIGS. 3 and 11 is formed by the same processes as those of the first energy ray radiating apparatus 30 except for moving the relative motion supplying unit 100A relatively while operating the flat substrate supporting unit 110.

In FIGS. 3 and 11, the flat substrate 1 formed with the first microscopic pattern 3 is called a cutting master.

In this embodiment of the present invention, address information formed on a groove "G" is an address that changes continuously at a position on an information recording medium 11 shown in FIG. 10, which will be explained later. The address information is data that is selected out from absolute address, which is allocated to whole area of the information recording medium 11, relative address, which is allocated to a partial area, track number, sector number, frame number, field number and time information. These data change incrementally or decrement continuously in accordance with progressing of a recording track (groove "G", for example). In addition to the address information, specific information that is composed of a small amount of data can be formed together with the address information.

The specific information is common data in the whole area of the information recording medium 11. The common data is at least selected out from information related to the information recording medium such as classification of the information recording medium, size of the information recording medium, supposed recording capacity of the information recording medium, supposed recording linear density of the information recording medium, supposed recording linear velocity of the information recording medium, track pitch of the information recording medium, recording strategy information, reproduction power information, manufacture information, manufacturing number, lot number, control number, copyright related information, key for producing cryptograph, key for deciphering, ciphered data, recording permission code, recording refusal code, reproduction permission code and reproduction refusal code, for example.

It is acceptable that these address and specific information are information, which is described by the decimal number system or the hexadecimal number system and converted into the binary number system (such as the BCD code and the gray code). Further, it is also acceptable that the address and specific information are accompanied by an error correction code for preventing data from error.

The address information is formed by wobbling of groove "G" as mentioned above. A signal, which is supplied to the beam shaper 122, is transmitted from the processor (not shown) that generates a modulation signal in accordance with digital data of address information. In a case that the address information is in digital, the modulation signal to be generated is constituted by any one of the amplitude-shift keying modulation wave 250 (250, 251 and 252), the frequency-shift keying modulation wave 260 (260, 261 and 262) and the phase-shift keying modulation wave 270 (270, 271 and 272) or by any one of them that are transformed.

These modulation systems will be detailed later. By the amplitude-shift keying modulation system, an address is expressed in digital data (such as "1" and "0") in response to whether a fundamental wave is existed or not, or amplitude strength exceeds a predetermined value or not. In a case of the frequency-shift keying modulation system, an address is expressed in digital data (such as "1" and "0") in response to a frequency of the fundamental wave, whether the frequency is higher or lower. In a case of the phase shift modulation system, an address is expressed in digital data (such as "1" and "0") in response to a phase angle difference of the fundamental wave (for example, a phase angle difference of fundamental wave at each interval of one period).

By adopting these modulation systems, an address can be formed in high efficiency. A fundamental wave of these modulations can be selected out from any of a sine wave (or a cosine wave), a triangular wave and a rectangular wave. If a sine wave (or a cosine wave) is selected out from them, a harmonic component can be minimized when reproducing and resulted in improving electric power efficiency and suppressing jitter. Therefore, a sine wave (or a cosine wave) is suitable for a fundamental wave.

The address is formed by the first or second energy ray radiating apparatus 30 or 40 such that the spot "ES" is modulated to a direction perpendicularly to a progressing direction of a track in accordance with a modulation system. In other words, a direction of time axis of modulation signal is transformed to a track direction of groove "G" and further an amplitude direction of the modulation signal is transformed to a direction perpendicular to the groove "G", and then the address is formed.

(Process for Forming First Plating Layer)

As shown in FIG. 4, a first plating layer 4 is formed over the flat substrate 1 having the first microscopic pattern 3.

In a case that either the positive type energy ray sensitive film 2 or the flat substrate 1 is conductive, the first plating layer 4 is formed by plating directly on the surface of the positive type energy ray sensitive film 2. Further, in a case that either one of the positive type energy ray sensitive film 2 and the flat substrate 1 is nonconductor or semiconductor, a thin conductive film (not shown) is formed on the surface of the positive type energy ray sensitive film 2 as pretreatment, and then the first plating layer 4 is formed on the thin conductive film through a plating process.

Hereinafter, the thin conductive film is considered to be a part of the first plating layer 4.

Nickel and cobalt having thickness within a rage of 100 µm to 500 µm, more desirably 200 µm to 400 µm, and most desirably 240 µm to 310 µm, or an alloy that contain nickel or cobalt can be used for the first plating layer 4.

A metal such as nickel, nickel-palladium alloy, nickel-phosphorus alloy, nickel-boron alloy, nickel-phosphorus-boron alloy, gold, silver, silver-palladium alloy and silver-palladium-copper alloy having thickness within a range of 50 nm to 150 nm, desirably about 100 nm can be used for the thin conductive film. In accordance with necessity, a reinforcing plate can be adhered on a surface of the first plating layer 4 that is opposite to the positive type energy ray sensitive film 2. A plate such as glass, aluminum and stainless steel having thickness within a range of 0.3 mm to 20 mm can be used for such a reinforcing plate.

(Process for Producing First Plating Die)

As shown in FIG. 5, a first plating die 5 is produced by peeling off the first plating layer 4 from the flat substrate 1 that is formed with the positive type energy ray sensitive film 2.

The peeling off is performed physically along the boundary between the positive type energy ray sensitive film 2 and the first plating layer 4. In a case of having the thin conductive film as mentioned above, the peeling off can be applied to the boundary between the thin conductive film and the first plating layer 4. If the peeling off is processed chemically, residue of the positive type energy ray sensitive film 2 that is adhered on the first plating film 4 can be reduced and the first plating die 5 having less defective second microscopic pattern 3A can be obtained.

The second microscopic pattern 3A on the first plating die 5 that is peeled off from the flat substrate 1 is reversely arranged to the first microscopic pattern 3 that is formed by the "process for forming microscopic pattern" as mentioned above in a relationship between concave and convex.

Further, in consideration of a succeeding "process for forming substrate", a total shape of the first plating die 5 can be modified while a shape of the second microscopic pattern 3A in the first plating die 5 is maintained.

(Process for Forming Second Plating Layer)

As shown in FIG. 6, a second plating layer 6 is formed on the first plating die 5 that is formed with the second microscopic pattern 3A.

(Process for Producing Second Plating Die)

As shown in FIG. 7, peeling off the second plating layer 6 from the first plating die 5 produces a second plating die 7 that is formed with a third microscopic pattern 3B.

In this process, the third microscopic pattern 3B of the second plating die 7 is identical to the first microscopic pattern 3 that is formed by the "process for forming microscopic pattern" in a relationship between concave and convex.

(Process for Forming Substrate)

As shown in FIG. 8, a fourth microscopic pattern 3C is formed by transferring the third microscopic pattern 3B of the second plating die 7 to a substrate 8.

In this process, commonly known forming methods such as injection molding, compression molding, injection compression molding and 2P (Photo Polymerization) molding can be used for forming the substrate 8 having the fourth microscopic pattern 3C. The fourth microscopic pattern 3C formed on the substrate 8 is reversely arranged to the first microscopic pattern 3 formed on the flat substrate 1 in a relationship between concave and convex.

With respect to a material of the substrate 8, a synthetic resin is used for the substrate 8. Typical examples of the synthetic resin are as follows: various thermoplastic and thermosetting resins such as polycarbonate, polymethyle methacrylate, polystyrene, copolymer of polycarbonate and polystyrene, polyvinyl chloride, alicyclic polyolefin and polymethyle pentene, and various energy ray curable resins (including examples of ultraviolet (UV) ray curable resins, visible radiation curable resins and electron beam curable resins). They can be used suitably.

Further, these materials can be applicable to be a synthetic resin that is combined with metal powder or ceramic powder. Due to necessity of supporting an information recording medium mechanically, thickness of the substrate 8 is within a range of 0.3 mm to 3 mm, desirably 0.5 mm to 2 mm. Furthermore, in a case that an information recording medium 11 shown in FIG. 10, which will be explained later, is in disciform, thickness of the substrate 8 is most desirable to be designed such that total thickness of the information recording medium 11, which is composed of the substrate 8, a recording layer 9 (refer to FIG. 9) and a light transmitting layer 10 (refer to FIG. 10), becomes 1.2 mm in consideration of interchangeability with a conventional optical disc.

(Process for Forming Recording Layer)

As shown in FIG. 9, a recording layer 9 is formed on the fourth microscopic pattern 3C of the substrate 8.

The recording layer 9 is a thin film layer having functions such as reading out information, recording information or rewriting information. With respect to a material for the recording layer 9, there is provided a phase change material, which induces a change of reflectivity, a change of refractive index or both of them before and after recording, a magneto-optical material, which induces a change of Kerr rotation angle before and after recording, and a dye material, which induces a change of refractive index, a change of depth or both of them before and after recording.

With respect to an actual example of phase change material, alloys composed of an element such as indium, antimony, tellurium, selenium, germanium, bismuth, vanadium, gallium, platinum, gold, silver, copper, aluminum, silicon, palladium, tin and arsenic are used, (wherein an alloy includes a compound such as oxide, nitride, carbide, sulfide and fluoride). Particularly, alloys composed of a system such as Ge—Sb—Te system, Ag—In—Te—Sb system, Cu—Al—Sb—Te system and Ag—Al—Sb—Te system are suitable for the recording layer 9. These alloys can contain one or more elements as a micro additive element within a range of more than 0.01 atomic % and less than 10 atomic % in total. Such a micro additive element is selected out of Cu, Ba, Co, Cr, Ni, Pt, Si, Sr, Au, Cd, Li, Mo, Mn, Zn, Fe, Pb, Na, Cs, Ga, Pd, Bi, Sn, Ti, V, Ge, Se, S, As, Tl and In.

With respect to compositions of each element, for example, there is existed $Ge_2Sb_2Te_5$, $Ge_1Sb_2Te_4$, $Ge_8Sb_{69}Te_{23}$, $Ge_8Sb_{74}Te_{18}$, $Ge_5Sb_{71}Te_{24}$, $Ge_5Sb_{76}Te_{19}$, $Ge_{10}Sb_{68}Te_{22}$ and $Ge_{10}Sb_{72}Te_{18}$ as for the Ge—Sb—Te system and a system adding a metal such as Sn and In to the Ge—Sb—Te system as for the Ge—Sb—Te system. Further, as for the Ag—In—Sb—Te system, there is existed $Ag_4In_4Sb_{66}Te_{26}$, $Ag_4In_4Sb_{64}Te_{28}$, $Ag_2In_6Sb_{64}Te_{28}$, $Ag_3In_5Sb_{64}Te_{28}$, $Ag_2In_6Sb_{66}Te_{26}$, and a system adding a metal or semiconductor such as Cu, Fe and Ge to the Ag—In—Sb—Te system.

With respect to an actual example of magneto-optical material, alloys composed of an element such as terbium, cobalt, iron, gadolinium, chromium, neodymium, dysprosium, bismuth, palladium, samarium, holmium, praseodymium, manganese, titanium, erbium, ytterbium, lutetium and tin can be used, (wherein an alloy includes a compound such as oxide, nitride, carbide, sulfide and fluoride). Particularly, constituting an alloy of a transition metal, which is represented by TbFeCo, GdFeCo and DyFeCo, with rare earth element is preferable. Further, the recording layer 9 can be constituted by using an alternate lamination layer of cobalt and platinum.

With respect to an actual example of dye material, porphyrin dye, cyanine dye, phthalocyanine dye, naphthalocyanine dye, azo dye, naphthoquinone dye, fulgide dye, polymethine dye and acridine dye can be used.

With respect to a forming method of the recording layer 9, a film forming method such as a vapor phase film forming method and a liquid phase film forming method can be used. As a typical example of the vapor phase film forming method, such methods as vacuum deposition of resister heating type or electron beam type, direct current sputtering, high frequency sputtering, reactive sputtering, ion beam sputtering, ion plating and chemical vapor deposition (CVD) can be used. Further, with respect to a typical example of the liquid phase film forming method such as spin coating method and dipping and drawing up method can be used.

(Process for Forming Light Transmitting Layer)

As shown in FIG. 10, an information recording medium 11 is manufactured by forming a light transmitting layer 10 on the recording layer 9, which is produced through the processes shown in FIGS. 1 through 9.

A concave shaped section, which sinks to the light transmitting layer 10 side with observing from the substrate 8 side, is equivalent to the groove "G" that is formed by a converged energy ray in the process for forming a microscopic pattern shown in FIG. 3, as a result.

Consequently, wobble signals of both sides of the groove "G" can be unified so as to have the same period and phase when reproducing the recording layer 9 formed on the groove "G" of the information recording medium 11 by irradiating a laser beam "LB" from the light transmitting layer 10 side as shown in FIG. 10.

The light transmitting layer 10 is composed of a material having function of conducting converged reproducing light to the recording layer 9 with keeping the converged reproducing light in less optical distortion. For example, a material having transmittance of more than 70% at a reproduction wavelength $\lambda$, preferably more than 80% can be suitably used for the light transmitting layer 10. It is essential for the light transmitting layer 10 to be less optical anisotropy. In order to suppress reduction of reproducing light, actually, a material having birefringence of less than ±100 nm, preferably ±50 nm by 90-degree (vertical) incident double paths and in a sheet shape having thickness within a range of 50 µm to 120 µm, preferably 70 µm to 100 µm is used for the light transmitting layer 10.

With respect to a material in a sheet shape having such a birefringence characteristic, a synthetic resin such as polycarbonate, polymethyle methacrylate, cellulose triacetate, cellulose diacetate, polystyrene, copolymer of polycarbonate and polystyrene, polyvinyl chloride, alicyclic polyolefin and polymethyle pentene can be used for the light transmitting layer 10 in a sheet shape.

Further, a material having high stiffness can also be used for the light transmitting layer 10. For example, transparent ceramics (such as soda lime glass, soda aluminosilicate glass, borosilicate glass and silica glass), thermosetting resin, energy ray curable resin (such as ultraviolet rays curable resin, visible radiation curable resin and electron beam curable resin), moisture curable resin and two-part liquid mixture curable resin are preferably used for the light transmitting layer 10 having high stiffness.

Furthermore, the light transmitting layer 10 is not limited to a single layer. A plurality of layers that is combined by those materials can be applied to the light transmitting layer 10.

With respect to a forming method of the light transmitting layer 10, in a case that the light transmitting layer 10 is constituted by a single layer of sheet shaped material, a heat welding method is utilized. In a case that the light transmitting layer 10 is constituted by a single layer of various curable resins, a spin coating method, a screen printing method, a roll coating method or a knife coating method can be utilized.

The light transmitting layer 10 can also be constituted by two layers of a sheet shaped material and various curable resins. In this case, there existed a method that is constituted by several processes such as sandwiching any of various curable resins between the light transmitting layer 10 and the recording layer 9, spinning off excessive curable resin, and then thin-filming the curable resin and adhering them together by centrifugal force.

A fluctuation amount of thickness of the light transmitting layer 10 in one surface is desirable to be ±0.003 mm maximum in consideration of spherical aberration of the information recording medium 11 when reproducing. Particularly, in a case that numerical aperture (NA) of objective lens is more than 0.85, the fluctuation amount is desirable to be less than ±0.002 mm. Further, in a case that NA of an objective lens is 0.9, the fluctuation amount is desirable to be less than ±0.001 mm.

According to the embodiment of the present invention, as mentioned above, the information recording medium 11 is manufactured by the process constituting the "process for forming first plating layer" through the "process for forming second plating die" by using the positive type energy ray sensitive film 2. Therefore, each wobbling period and phase of both sides of the land "L" on the substrate 8 can be unified.

As a result, an information recording medium 11 in which an information track is equivalent to a concave section that projects into the light transmitting layer 10 with observing from the side to be irradiated with the laser beam "LB" can be manufactured. Further, information can be recorded on the concave section, so that a reproduced signal, which is high in output and quality, can be obtained, and recording and reproducing in less error rate and in high density can be realized. Furthermore, since wobbling period and phase of both sides of the concave section are equal to each other, interference never happens and accurate address information can be reproduced.

The case that the energy ray sensitive film 2 is the positive type is explained above. However, a case of a negative type can also be realized as same as the positive type.

With referring to FIGS. 14 and 15, a case of negative type energy ray sensitive film 2 is explained next.

(Process for Producing Negative Type Plating Die)

FIG. 14 is a cross sectional view of a negative type energy ray sensitive film in a producing process of a plated die in a negative type according to the embodiment of the present invention.

In a case of negative type, a concave shaped section and a convex shaped section are reversely arranged in comparison with those of the positive type if the same processes for the positive type are applied to the negative type. Consequently, a relationship between groove and land is also reversed.

As shown in FIG. 14, a third plating die 12 having a fifth microscopic pattern 3D, which is reversely arranged in comparison with the second microscopic pattern 3A that is formed on the first plating die 5 shown in FIG. 5, is produced through the similar processes of the "process for preparing substrate" through the "process for producing first plating die" shown in FIGS. 1 through 5 respectively.

(Process for Forming Negative Type Substrate)

FIG. 15 is a cross sectional view of a negative type substrate in a forming process of negative type substrate according to the embodiment of the present invention.

As shown in FIG. 15, a sixth microscopic pattern 3E is formed by transferring the fifth microscopic pattern 3D of the third plating die 12 to a substrate 8, wherein the third plating die 12 is identical to the second plating die 7 shown in FIG. 7.

By using the substrate 8, an information recording medium 11 shown in FIG. 10 is manufactured by similar processes to the "process for forming recording layer" and the "process for forming light transmitting layer" shown in FIGS. 9 and 10 respectively.

In a case that a negative type energy ray sensitive film 2 is used, each period and phase of wobbles of both sides of a convex shaped section, which projects to the light transmitting layer 10 with observing from a side that is irradiated with a laser beam "LB" shown in FIG. 10, can be equalized by the same processes for the positive type energy ray sensitive film 2 although the "process for forming second plating layer" and the "process for producing second plating die", which are shown in FIGS. 6 and 7 respectively, are omitted.

As a result, an information recording medium 11 in which an information track is equivalent to a concave section that projects into the light transmitting layer 10 with observing from the side to be irradiated with the laser beam "LB" can be manufactured. Further, information can be recorded on the concave section, so that a reproduced signal, which is high in output and quality, can be obtained, and recording and reproducing in less error rate and in high density can be realized. Furthermore, since each wobbling period and phase of both sides of the concave section are equal to each other, interference never happens and accurate address information can be reproduced.

With referring to FIGS. 16 through 18, a supplemental explanation is given to features of physical shape of microscopic pattern in the information recording medium 11.

FIG. 16 is a fragmentary plan view, partially enlarged, of a microscopic pattern formed on an information recording medium, which is manufactured by the manufacturing method of information recording medium according to the embodiment of the present invention.

FIG. 17 is a fragmentary plan view, partially enlarged, of an information recording medium, which is suitable for a CLV (Continuous Linear Velocity) recording in a disc shape, according to the present invention.

FIG. 18 is a fragmentary plan view, partially enlarged, of an information recording medium, which is suitable for a CLV recording in a disc shape and recorded by a user, according to the present invention.

The information recording medium 11 is recorded by the constant linear velocity (CLV) method as an information recording medium in disciform. FIG. 16 shows an exemplary configuration, which is composed of three grooves "G1" through "G3" (hereinafter generically referred to as groove "G") and two lands "L1" and "L2" (hereinafter generically referred to as land "L"). In FIG. 16, each sidewall of each land "L", which faces toward an inner circumference direction, is defined as "L1$i$", "L2$i$" (hereinafter generically referred to as inner sidewall "Li") respectively and each sidewall toward an outer circumference direction of each land "L" is defined as "L1$o$" and "L2$o$" (hereinafter generically referred to as outer sidewall "Lo") respectively. Further, each sidewall of each groove "G", which faces toward the inner circumference direction, is defined as "G2$i$" an "G3$i$" (hereinafter generically referred to as inner sidewall "Gi") and each sidewall toward the outer circumference direction of the groove "G" is defined as "G1$o$" and "G2$o$" (hereinafter generically referred to as outer sidewall "Go") respectively, wherein the inner sidewall "Li" and the outer sidewall "Go", and the outer sidewall "Lo" and the inner sidewall "Gi" are the same sidewall respectively.

Furthermore, the groove "G" is wobbled in the radial direction and recorded with an address. The information recording medium 11 is manufactured by the "process for forming first plating layer" through the "process for producing second plating die" shown in FIGS. 4 through 7 respectively. Therefore, wobbles of both sidewalls of the groove "G" (that is, "Gi" and Go") are formed in a same period and phase. Consequently, the sidewalls of the groove "G", that is, inner sidewall "Gi" and the outer sidewall "Go" are always formed in parallel to each other.

In FIG. 16, the information recording medium 11 is recorded by the CLV method. However, it can be recorded by the constant angular velocity (CAV) method. In the case of the CAV method, both sidewalls of the land "L" (that is, "Li" and "Lo") are formed in parallel to each other as well as forming both sidewalls of the groove "G" (that is, "Gi" and "Go") in parallel to each other.

FIG. 17 shows an exemplary configuration, which is composed of four grooves "G1" through "G4" (hereinafter generically referred to as groove "G") and three lands "L1" through "L3" (hereinafter generically referred to as land "L"). The groove "G" is wobbled in the radial direction and recorded with an address. In FIG. 17, a centerline of the groove "G" is shown by a chain line. A distance between two chain lines, which are adjacent to each other, is defined as pitch "P". Wobbling width of the wobbling groove "G" is shown by two doted lines and the width in peak to peak is defined as Δ. In a case of reproducing the information recording medium 11, as mentioned above, a laser beam is focused on the groove "G". A reproducing spot diameter (=λ/NA) of the laser beam is shown as "S" in FIG. 17, (wherein λ is a wavelength of the laser beam for reproducing that is installed in a reproducing apparatus and NA is numerical aperture of an objective lens for converging the laser beam).

The dimensions of the fourth microscopic pattern 3C is defined as P≦S. As shown in FIG. 18, by recording only in a portion of the recording layer 9 that is equivalent to the groove "G", a record mark "M", which is in high output and less fluctuation in the time axis, can be written. Further, when reproducing the information recording medium 11, a record mark "M", which is hardly erased by a reproducing laser beam, can be recorded. By decreasing the pitch "P" in dimensions so as to be smaller than the reproducing spot diameter "S" of the laser beam, heat-accumulating effect is generated and recording in high energy density, that is, in high contrast can be realized.

If a violaceous laser, for example, is used, λ (wavelength) of the violaceous laser is within a range of 350 nm to 450 nm. Further, if an objective lens in high NA is used, NA is within a range of 0.75 to 0.9. Consequently, a pitch "P" is assigned to be within a range of 250 nm to 600 nm. Furthermore, in a case of taking into consideration of recording a digital video picture by a high definition television (HDTV) for approximately two hours, more than 20 GB of recording capacity is essential. Therefore, a pitch "P" is desirable to be within a range of 250 nm to 450 nm. In a case that NA is within a range of 0.85 to 0.9, the pitch "P" is desirable to be within a range of 250 nm to 400 nm particularly. In a case that NA is 0.85 to 0.9 and λ is within a range of 350 nm to 410 nm, the pitch "P" is most desirable to be within a range of 250 nm to 360 nm.

More, with respect to depth of the fourth microscopic pattern 3C, that is, elevation difference between a concave shaped section and a convex shaped section, it is suitable for the elevation difference to be within a range of λ/8n to λ/20n, wherein "n" is a refractive index of the light transmitting layer 11 at the wavelength of λ.

Reflectivity of the recording layer 9 reduces in response to the presence of the fourth microscopic pattern 3C, so that the elevation difference is desirable to be smaller. A limit of the elevation difference that prevents an error rate of reproduced signal from deteriorating is preferable to be less than λ/10n. Further, a push-pull signal (difference signal) increases together with increasing of the elevation difference while tracking, so that more than λ/18n of elevation difference is essential as a limit value of enabling the tracking. In other words, the elevation difference is most desirable to be within a range of λ/10n to λ/18n.

In a case that the fourth microscopic pattern 3C is designed so as to be P≦S, it is essential for the wobbling width Δ to be assigned as Δ<P. If the fourth microscopic pattern 3C is formed as mentioned above, both of adjoining tracks (for example, both of adjoining grooves "G") would not contact with each other physically, so that cross writing can be avoided when recording.

The inventors of the present invention actually make an experiment that a phase change recording material is selected for a recording layer 9 of information recording medium 11 and the recording layer 9 is recorded in accordance with reflectivity difference, phase difference or both differences of the reflectivity and the phase.

In other words, by writing random data in the information recording medium 11 by the phase change recording method and reproducing an address by the push-pull method, it is found that a limit, which enables to detect an address, is 0.01 S≦Δ and the random data that is written by the phase change recording method is extremely superimposed on the address as noise with respect to a groove, which is manufactured by Δ that is smaller than 0.01 S, and resulted in increasing of an error rate of the address rapidly.

In the case of 0.01 S≦Δ, an address can be reproduced sufficiently even though the recording layer 9 is in a low reflectivity state (such as an amorphous state) by the phase change recording method. In the case of 0.15 S<Δ, fluctuation in the time axis of an address occurs because of influence of reproduction cross-talk from an adjoining track and resulted in deteriorating stability. Accordingly, a condition, which satisfies relation of Δ<P and 0.01 S≦Δ≦0.15 S, is most suitable for the recording layer 9.

In FIG. 18, a record mark "M" is recorded only in a wobbling groove "G". The record mark "M" shows a modulation signal that is ON or OFF and is in various length. As mentioned above, the record mark "M" is formed in the recording layer 9. In a case that the recording layer 9 is made by a phase change material, the record mark "M" is recorded in the recording layer 9 by reflectivity difference, phase difference or both differences of the reflectivity and the phase.

With respect to a recording method of the record mark "M", the CLV recording method is applied for the record mark "M" to be recorded by a user if the fourth microscopic pattern 3C of the information recording medium 11 is manufactured for the purpose of the CLV recording. On the contrary, if the fourth microscopic pattern 3C of the information recording medium 11 is manufactured for the CAV recording, the CAV recording method is applied for the record mark "M" to be recorded by a user. Consequently, user data that is in synchronism with an address can be accurately recorded while reproducing accurate address information from a groove "G".

With referring to FIGS. 19 through 27, the amplitude-shift keying modulation wave 250 (250, 251 and 252), the frequency-shift keying modulation wave 260 (260, 261 and 262) and the phase-shift keying modulation wave 270 (270, 271 and 272), which are used for recording an address in an information recording medium 11, are explained next.

As mentioned above, these modulated waves are a signal form to be inputted to the beam shaper 122, at the same time, they are identical to a groove shape to be formed in a first microscopic pattern 3.

That is, the time axis direction of these modulated waves are transformed into a track direction of groove "G" in the first microscopic pattern 3, at the same time, an amplitude direction of modulation signal is transformed into a direction perpendicular to the groove "G" and the modulation signal is recorded in the groove "G".

In other words, the time axis direction of these modulated waves are transformed into a track direction of groove "G" in a forth microscopic pattern 3C, at the same time, an amplitude direction of modulation signal is transformed into a direction perpendicular to the groove "G" and the modulation signal is recorded in the groove "G". Hereinafter, the modulated waves are explained as a shape of the groove "G" that constitutes the fourth microscopic pattern 3C. They are the same situation as a signal form to be inputted to the beam shaper 122.

With referring to FIGS. 19 through 21, the amplitude-shift keying modulation waves 250, 251 and 252 are depicted.

As shown in FIG. 19, the amplitude-shift keying modulation wave 250 is recording data in shape by the amplitude-shift keying modulation system. Actually, the amplitude-shift keying modulation wave 250 is constituted by an amplitude section 2501 and a non-amplitude section 2500, wherein the amplitude section 2501 is formed by wobbling a groove "G" in a predetermined period.

In other words, the amplitude section 2501 is a wobbling part of the groove "G" and the non-amplitude section 2500 is a non-wobbling part of the groove "G". Further, the amplitude section 2501 and the non-amplitude section 2500 are corresponding to "1" and "0" of a data bit respectively.

The amplitude section 2501 is composed of a plurality of waves. A number of waves is not limited. However, if it is too many, length of the non-amplitude section 2500 consequently becomes longer and resulted in that a fundamental wave, which produces a gate when reproducing, is hardly detected. Therefore, two to one hundred waves, preferably three to thirty waves are suitable for the number of waves of the amplitude section 2501. As mentioned above, digital data (in a case of FIG. 19, it is "10110") is recorded by whether amplitude is existed or not, or whether amplitude strength exceeds a predetermined value or not.

A push-pull method, which will be explained later, can be used for reading out recorded data. Further, it should be understood that the amplitude-shift keying modulation wave 250 does not limit each length or each amplitude size of the amplitude section 2501 and the non-amplitude section 2500 to specific figure. In the case of the amplitude-shift keying modulation wave 250 shown in FIG. 19, the length of the amplitude section 2501 is set to be longer than that of the non-amplitude section 2500.

In FIG. 20, an amplitude-shift keying modulation wave 251 is constituted by amplitude sections 2511a through 2511c and non-amplitude sections 2511. Each amplitude of the amplitude sections 2511a through 2511c is unequal to each other. However, unequal amplitude is acceptable for the amplitude-shift keying modulation system. Further, it is also acceptable that assigning each amplitude in multiple levels intentionally realizes recording in multi-values more than three values.

Furthermore, in a case of an amplitude-shift keying modulation wave 252 shown in FIG. 21, each amplitude of amplitude sections 2521 is equal to each other and each length of the amplitude sections 2521 is equal to that of non-amplitude sections 2520. This configuration is also acceptable for the amplitude-shift keying modulation system.

Particularly, in a case that data are recorded in digital by the binary value of "0" and "1", an isotropic layout as shown in FIG. 21 is desirable for the digital recording by the binary value. In other words, if each height of the amplitude sections 2521 is made equal to each other and each length of the amplitude sections 2521 is made equal to that of the non-amplitude sections 2520, judging "0" or "1" when reproducing can be realized by sufficient threshold value of amplitude. Moreover, data arranged in series can be read out by one threshold value, so that a reproducing circuit can be simplified.

Even in a case where jitter exists in reproduced data, the influence of the jitter can be minimized. Further, with assuming that a code to be recorded is ideally symmetrical, total length of the amplitude sections 2521 is made equal to that of the non-amplitude sections 2520 and resulted in no DC (direct current) component in a reproduced signal. It is advantageous to digital recording that no DC component releases a burden on data decoding and servo.

As mentioned above, by using any of the amplitude-shift keying modulation waves 250, 251 and 252, an address is recorded in an information recording medium 11 according to the embodiment of the present invention. Either "0" or "1" is recorded in response to whether a wobble is existed on a sidewall of groove "G" or not, so that ability of judging "0" or "1" is excellent. In other words, a low error rate can be obtained even though an address is in relatively low C/N (carrier to noise ratio). Further, influence of random noise caused by the recording can be reduced and a low error rate can be maintained, even though recording on a recording layer 9 is performed by a user.

With referring to FIGS. 22 through 24, frequency-shift keying modulation waves 260 through 262 are explained next.

The frequency-shift keying modulation waves 260 through 262 are a waveform for recording data in shape by the frequency-shift keying modulation system and the waveform is composed of a plurality of sections, which are formed by wobbling a groove "G" by various frequencies. Actually, in the case of binary data, the frequency-shift keying modulation wave is recorded in shape by using a higher frequency section and a lower frequency section. In a case of multi-valued data such as "n" values, a frequency-shift keying modulation wave is recorded in shape by the frequency-shift keying modulation system that uses "n" kinds of frequency sections.

FIG. 22 is one example of recording data "10110" in shape. In FIG. 22, the frequency-shift keying modulation wave 260 is composed of three higher frequency sections 2601 and two lower frequency sections 2600. The higher frequency section 2601 and the lower frequency section 2600 are equivalent to "1" and "0" of a data bit respectively and they are recorded in digital by changing the frequency at each one channel bit.

A number of waves that constitute each frequency section is not limited to one specific number. Each frequency section is composed of a wave that continues more than one cycle. However, in consideration of that data are not redundant too much in a reproducing apparatus so as to detect a frequency accurately and obtain a certain degree of data transfer rate, each frequency section, which is corresponding to each data bit that is mentioned above, is desirable to be constituted by a number of waves within a range of one cycle to one hundred cycles, preferably one cycle to thirty cycles.

It is acceptable that each amplitude of the higher frequency section 2601 and the lower frequency section 2600 is equal to each other. However, an amplitude ratio is not limited to one specific figure. Amplitude of the higher frequency section 2601 can be formed larger than that of the lower frequency section 2600 in consideration of a frequency response of reproducing apparatus. If the higher frequency section 2601 is formed in larger amplitude, output attenuation at a higher frequency range in the reproducing apparatus can be complemented and resulted in improvement of readout ability of the reproducing apparatus. In addition, the commonly known push-pull method can be used for reading out recorded data.

It should be understood that the information recording medium 11 according to the present invention does not place a restraint on physical length or amplitude size of a channel bit, which is composed of the higher frequency section 2601 and the lower frequency section 2600. For example, in FIG. 22, the physical length of lower frequency section 2600 is designated to be longer than that of the higher frequency section 2601.

As shown in FIG. 23, it is acceptable for a frequency-shift keying modulation wave 261 that each amplitude and each length of a higher frequency section 2611 and a lower frequency section 2610 are equivalent to each other.

By equalizing each amplitude and length as mentioned above, judging "0" or "1" can be performed by sufficient threshold value of amplitude when reproducing. Further, data arranged in series can be read out by one threshold value of time, so that a reproducing circuit can be simplified.

Furthermore, in case jitter exists in reproduced data, the influence of the jitter can be minimized. Moreover, with assuming that a code to be recorded is ideally symmetrical, total length of the higher frequency sections 2611 is equal to that of the lower frequency sections 2610 and resulted in no DC component in a reproduced signal. It is advantageous to digital recording that no DC component releases a burden on data decoding and servo.

In FIGS. 22 and 23, the higher frequency section 2601 or 2611 and the lower frequency section 2600 or 2610 are connected to each other respectively, wherein each waveform rises at a point where a channel bit changes. However, phase jump happens in probability of 50% at the moment when a channel bit changes. Consequently, a high frequency component is generated and resulted in deterioration of power efficiency per each frequency.

FIG. 24 shows an example for improving the above-mentioned problem. In FIG. 24, a higher frequency section 2621r or 2621f (hereinafter referred generically to as higher frequency section 2621) and a lower frequency section 2620 are arranged so as to maintain phase continuity at a point where each channel bit of a frequency-shift keying modulation wave 262 changes over. Actually, a starting phase of the lower frequency section 2620 is selected so as to be that a phase direction of the end of the higher frequency section 2621 and a phase direction of the start of the lower frequency section 2620 are the same direction. Further, the reverse connection is the same as such that a starting phase of the higher frequency section 2621 is selected so as to be that a phase direction of the end of the lower frequency section 2620 and a phase direction of the start of the higher frequency section 2621 are the same direction.

If the starting phase is selected as mentioned above, continuity of phase is maintained and power efficiency is improved. Further, a reproduction envelope becomes constant, so that a data error rate of address, which is recorded in the information recording medium 11, is improved.

Furthermore, a frequency of the higher frequency section 2621 (2601, 2611 or 2621) and the lower frequency section 2620 (2600, 2610 or 2620) can be arbitrary selected. However, in order to eliminate interference with a frequency range that is provided for recording data on the information recording medium 11 by a user, it is strictly required for the higher frequency section 2621 not to be extremely high frequency in comparison with the frequency of lower frequency section 2620.

On the other hand, in order to improve a reproduction error rate of address data, frequency difference between the higher frequency section 2621 and the lower frequency section 2620 shall be kept in certain degree so as to maintain excellent separativeness. From these points, a frequency ratio of the higher frequency section 2621 to the lower frequency section 2620 is desirable to be within a range of 1.05 to 5.0, particularly, within a range of 1.09 to 1.67. In other words, phase relation between two frequencies is desirable to be within a range of $2\pi \pm (\pi/20.5)$ to $2\pi \pm (\pi/0.75)$, particularly, within a range of $2\pi \pm (\pi/12)$ to $2\pi \pm (\pi/2)$ (that is, $360 \pm 15$ degrees to $360 \pm 90$ degrees), wherein the reference phase is defined as $2\pi$.

With respect to a frequency ratio (ratio of higher frequency to lower frequency), if the frequency ratio shown in FIG. 24 is assigned to be 1.5, there exists a phase relation between these higher and lower frequencies such that the higher frequency is shifted by $-\pi/2.5$ from a reference phase of a single-frequency wave and the lower frequency is shifted by $+\pi/2.5$ from the reference phase of the single-frequency wave, wherein the phase relation becomes $2\pi \pm$ ($\pi/2.5$) when the reference phase is defined as $2\pi$. In other words, the phase relation is $360 \pm 72$ degrees. It is expressed that these two frequencies are integral multiple (wherein it is three times and two times respectively) of the frequency (in this case 0.5) of the single-frequency wave. In addition thereto, the single-frequency wave is a wave having a frequency that is integral multiple of a frequency of fundamental wave accurately.

Consequently, it is advantageous for a demodulation circuit to be simplified. Further, generating a clock signal becomes easier by using a circuit having a window of 0.5. Furthermore, demodulation can be performed by a synchronous detector circuit. In this case, an error rate can be reduced extremely.

As mentioned above, an address is recorded in the information recording medium 11 of the present invention by the frequency-shift keying modulation waves 260, 261 and 262. The binary data "0" or "1" is recorded in accordance with change of a wobbling frequency, so that ability of judging "0" or "1" is excellent. In other words, an address can be obtained in a low error rate even though a C/N is relatively low.

More, influence of random noise caused by the recording can be reduced and a low error rate can be maintained, even though the recording layer 9 of the information recording medium 11 is recorded by a user.

Moreover, combining a frequency and a period can exhibit data. If each wobbling frequency of higher and lower frequencies is defined so as to be (higher frequency)÷(period of the higher frequency)=(low frequency)÷(period of lower frequency) although it is not shown in any drawings, each phase of wobbles coincides with each other when changing over the wobbling frequency, and a shape of groove "G" can be displaced smoothly at a point where a wobbling frequency changes over.

Accordingly, an error when detecting a wobble during reproduction decreases and resulted in an effect that reduces a demodulation error of information, which is embedded in a wobble. In a case of recording information "0" for eight periods by a wobble of 150 kHz and recording information "1" for seven periods by a wobble of 131.25 kHz, for example, each phase of 150 kHz and 131.25 kHz coincides with each other at a point where the frequency of 150 kHz changes over to 131.25 kHz or vise versa. Therefore, excellent information can be recorded.

With referring to FIGS. 25 through 27, phase-shift keying modulation waves 270, 271 and 272 are explained next.

As shown in FIG. 25, the phase-shift keying modulation wave 270 is formed by recording data in shape by the phase-shift keying modulation system and composed of a plurality of sections, which are formed by wobbling a groove "G" by a predetermined frequency. In the case of binary data, the phase-shift keying modulation wave 270 is composed of an advancing phase section 2701 and a receding phase section 2700. In a case of multi-valued data such as "n" values, a phase-shift keying modulation wave is composed of "n" phase sections, which correspond to "n" kinds of phases respectively.

FIG. 25 is one example of recording data "10110" in shape. In FIG. 25, the phase-shift keying modulation wave 270 is composed of three advancing phase sections 2701 and two receding phase sections 2700. The advancing phase section 2701 and the receding phase section 2700 are equivalent to "1" and "0" of a data bit respectively and recorded in digital by changing the phase at each one channel bit.

Actually, the advancing phase section 2701 and the receding phase section 2700 are exhibited by a sinusoidal wave of "sin 0" and another sinusoidal wave of "sin(−π)" respectively. As shown in FIG. 25, the advancing phase section 2701 and the receding phase section 2700 are constituted by one cycle of waveform respectively. However, phase difference between them is as many as π, so that they can be separated and reproduced sufficiently by the envelope detection method and the synchronous detection method.

Each frequency of the advancing phase section 2701 and the receding phase section 2700 is identical to each other. A number of waves, which constitutes the advancing phase section 2701 and the receding phase section 2700, is not restricted to a specific number. Both phase sections are composed of a wave that continues more than one cycle. However, in consideration of that data are not redundant too much in a reproducing apparatus so as to detect a frequency accurately and obtain a certain degree of data transfer rate, each phase section, which is corresponding to each data bit that is mentioned above, is desirable to be constituted by a number of waves within a range of one cycle to one hundred cycles, preferably one cycle to thirty cycles.

It is acceptable for each physical length of the advancing phase section 2701 and the receding phase section 2700 to be identical or not. If each physical length is identical, data, which are combined in series, can be divided into piece by a predetermined time (clock) when reproducing, so that a reproduction circuit can be simplified. Further, in case jitter exists in reproduced data, the influence of the jitter can be minimized.

It is also acceptable for each amplitude of the advancing phase section 2701 and the receding phase section 2700 to be coincide with each other or not. However, in consideration of easier reproduction, it is desirable for the advancing phase section 2701 and the receding phase section 2700 that each amplitude of them coincides with each other.

The information recording medium 11 of the present invention can deal with not only binary data but also multi-valued data. Dealing with how many kinds of phases depends on that phase difference of each data bit can be separated into what degree of resolution. The limit of separation of the information recording medium 11 is obtained experimentally by the inventors of the present invention and it is confirmed that phase difference can be separated into up to π/8. In other words, a multi-valued channel bit or various phase sections, which constitute the multi-valued channel bit, can deal with minimum phase difference of each phase sections within a range of π/8 to π, (wherein π is equivalent to minimum phase difference of a binary data). That is, a wide range of data from binary to hexadecimal can be dealt with.

FIG. 26 is an example showing a phase-shift keying modulation wave 271 that is recorded with 4-valued data. In FIG. 26 the phase-shift keying modulation wave 271 is composed of a first phase section 2710 [sin (−3π/4)], a second phase section 2711 [sin (−π/4)], a third phase section 2712 [sin (π/4)] and a fourth phase section 2713 [sin (3π/4)]. Minimum phase difference of each phase section is π/2, so that each of the 4-valued data can be sufficiently separated and obtained. In FIG. 26, the first phase section 2710, the second phase section 2711, the third phase section 2712 and the fourth phase section 2713 are corresponded to data "1", "2", "3" and "4" respectively for convenience.

When recording multi-valued data such as mentioned above, the multi-valued data can be replaced by multidimensional data. With assuming that the data is two-dimensional data (x, y), for example, it is applicable for the data "1" through "4" that the data "1" is replaced by data (0, 0), the data "2" by data (0, 1), the data "3" by data (1, 0) and the data "4" by data (1, 1) respectively.

FIG. 27 is another example, which deals with an address in the information recording medium 11 of the present invention. In FIG. 27, a fundamental wave is a saw-tooth wave and the waveform is asymmetrical for rising and falling sections. By controlling the rising and falling sections individually, difference of phase is exhibited.

In FIG. 27, data "1" is recorded as a section 2721 of which a wave rises gradually and falls rapidly (hereinafter referred to as a rapidly falling section 2721), and data "0" as a section 2720, which rises rapidly and falls gradually (hereinafter referred to as a rapidly rising section 2720).

When address data "10110" is recorded, for example, as shown in FIG. 27, the rapidly falling section 2710, the rapidly rising section 2720, the rapidly falling section 2721, the rapidly falling section 2721 and the rapidly rising section 2720 are sequentially recorded in shape. Such a recording method that records data by difference between a rising angle and a falling angle is advantageous for the data to be demodulated by inputting the data into a high-pass filter and extracting a differential component. Further, it is also advantage of the recording method that the data can be reproduced even under low C/N condition.

As mentioned above, an address is recorded in the information recording medium 11 of the present invention by the phase-shift keying modulation waves 270, 271 and 272. The binary data "0" or "1" is recorded in accordance with phase change of a number of wobbles, so that ability of judging "0" or "1" is excellent. Particularly, a frequency of the phase-shift keying modulation system is constant. Therefore, a filter, which is installed in a preceding stage of an address demodulation circuit, can be assigned to be a band-pass filter, which is specialized in one frequency, and any kind of noises including a noise that is caused by recording by a user can be eliminated effectively.

In other words, a lower error rate can be obtained even though a C/N is relatively low. Further, influence of random noise caused by the recording can be effectively eliminated and a low error rate can be maintained, even though the recording layer 9 of the information recording medium 11 is recorded by a user.

As mentioned above, when reproducing the information recording medium 11 that is recorded with those modulated waves, a reproducing apparatus that is equipped with a commonly known 2-division or 4-division photo detector can be used. In a case that the information recording medium 11, which is loaded in the reproducing apparatus, is disci-form, a signal is outputted by obtaining difference between an output from a divisional segment of the photo detector that is allocated in an inner circumference side of the information recording medium 11 and another output from another divisional segment that is allocated in an outer circumference side of the information recording medium 11 (this method is referred to as "push-pull method").

The output generates a signal that corresponds to a shape of wobbling groove "G". Therefore, the amplitude-shift keying modulation waves 250, 251 and 252, the frequency-shift keying modulation waves 260, 261 and 262 or the phase-shift keying modulation waves 270, 271 and 272, which are a shape of constituting the information recording medium 11, are restored as an electric signal. In other words, a track direction of groove "G" is transformed into a time axis direction of reproduced signal and a right angle direction that is perpendicular to the track direction of the groove "G" is transformed into an amplitude direction of the reproduced signal. The electric signal is the same signal as that is inputted into the beam shaper 122, which is used while manufacturing the information recording medium 11. Consequently, the inputted signal is restored as an almost similar signal to the inputted signal.

In the above-mentioned descriptions that are explained with referring to FIGS. 19 through 27, it is explained as one example of recording a fundamental wave, which is defined as a sine wave. Further, recording a fundamental wave, which is defined as a cosine wave, is also acceptable. An address wobble can be used by selecting out from the above-mentioned various kinds of modulated waves and can be selected in accordance with an application of the information recording medium 11.

It is acceptable that two or three different modulated waves are selected out from the various kinds of modulated waves mentioned above and recorded in different areas of a groove "G" respectively by the time-division recording method as well as forming the groove "G" by one modulated wave that is selected out from the various kinds of modulated waves. Further, it is acceptable that two different modulation systems are selected and modulated waves that are modulated by each of the two modulation systems are recorded by superimposing them in a same area of the groove "G" as multiplex recording.

Furthermore, it is applicable that a single frequency wave is recorded by superimposing it on each of the modulated waves. In other words, a frequency that is a same frequency as or different frequency to a frequency, which constitutes the amplitude-shift keying modulation waves 250, 251 and 252, and the frequency-shift keying modulation waves 260, 261 and 262, can be recorded by superimposing the same frequency or the different frequency on them.

Particularly, with respect to the frequency-shift keying modulation wave 260, either frequency of higher frequency section or lower frequency section can be superimposed on the frequency-shift keying modulation wave 260. Similarly, integer multiples of either frequency of higher frequency section or lower frequency section or the frequency over an integer can be superimposed on the frequency-shift keying modulation wave 260.

With respect to the phase-shift keying modulation wave 270, integer multiples of a frequency, which constitutes the phase-shift keying modulation wave 270, or the frequency over an integer can be superimposed on the phase-shift keying modulation wave 270.

In any cases, the single frequency wave, the amplitude-shift keying modulation wave 250, the frequency-shift keying modulation wave 260 and the phase-shift keying modulation wave 270 can be separated from the superimposed wave by a reproducing apparatus that is equipped with commonly known band-pass filter, phase detector or like. According to an experiment in the phase-shift keying modulation wave 270, for example, the phase-shift keying modulation wave 270 and a single frequency can be separated and reproduced without any problem if an amplitude ratio of the phase-shift keying modulation wave 270 to the single frequency wave is within a predetermined range of 1:5 to 5:1 when recording the single frequency wave by superimposing.

With respect to an alternative method, a type of wobble waveform can be used as information. For example, it is possible that information of a wobble, which is formed by a sine wave, is defined as "0" and information of another wobble, which is formed by a saw-tooth wave or a triangular wave, is defined as "1". Further, it is also possible to define as that information of a first wobble, which is formed by a sine wave, is "0", information of a second wobble, which is formed by a rectangular wave is "1", information of a third wobble, which is formed by a rapidly rising saw-tooth wave, is "2", information of a fourth wobble, which is formed by a rapidly falling saw-tooth wave, is "3", information of a fifth wobble, which is formed by triangular wave, is "4" and information of a section, which is formed by a straight line without wobbling, is "5". In a case of detecting even a shape of wobble by a reproducing apparatus, information can be exhibited by the quinary number system and resulted in advancing address information to higher density.

As mentioned above, the embodiment of the present invention explains about only fundamental areas. However, it should be understood that various modifications and additional functions could be applied to the information recording medium of the present invention in accordance with applications.

In the above-mentioned embodiment, each constituting component can be replace by each other and exchanged by another component that is disclosed in the specification. For example, the shape of the information recording medium 11 is not restricted to one shape, any shape such as disc, card and tape can be applied for the information recording medium 11. Further, a shape in circular, rectangular or elliptic can also be acceptable. Furthermore, an information recording medium having a hole is also acceptable.

In a case that the information recording medium 11 is in disciform, its dimension is not limited to one dimension. For example, in the case of diameter, various diameters from 20 mm to 400 mm can be applied for the information recording medium 11. Any diameter such as 30, 32, 35, 41, 51, 60, 65, 80, 88, 120, 130, 200, 300 and 356 mm can be acceptable.

It is also acceptable to laminate two information recording mediums 11 together by making each substrate 8 of the information recording mediums 11 face each other. Further, it is acceptable to layer one set of a recording layer 9 and a light transmitting layer 10 over a light transmitting layer 10 of the information recording medium 11. Consequently, recording capacity of the information recording medium 11 can be increased approximately twice. Furthermore, it is also acceptable to form a multi-layered information recording medium by layering a plurality of sets of a recording layer 9 and a light transmitting layer 10.

A groove "G" or a land "L" can be formed by not only the CLV method and the CAV method but also the ZCAV (Zone Constant Angular Velocity) and ZCLV (Zone Constant Linear Velocity) methods that are a method of forming zones, which are different from each other in radius, wherein each zone differs in a controlling system. In a case of forming a groove "G" or a land "L" by the ZCAV method, for example, CLV is realized in each zone and an information recording medium 11 (or a flat substrate 1) is totally controlled by a velocity that is close to CAV. On the contrary, in a case of the ZCLV method, CAV is realized in each zone and an information recording medium 11 is totally controlled by a velocity that is close to CLV.

Further, in the first through sixth microscopic patterns 3, 3A, 3B, 3C, 3D and 3E, a groove "G" and a land "L" are designated to be flat respectively. However, they are not limited to flat. At least either one of groove "G" and land "L" can be formed in a V-letter shape or an A-letter shape in their cross sectional view.

The recording layer 9 is shown as a single layer in FIGS. 9 and 10. However, the recording layer 9 can be formed by a plurality of thin film materials for a purpose of improving recording and reproducing characteristics and storage stability. With respect to an auxiliary material for such a thin film material, alloys composed of an element such as silicon, tantalum, zinc, magnesium, calcium, aluminum, chromium and zirconium, (wherein an alloy includes a compound such as oxide, nitride, carbide, sulfide and fluoride), and a high reflective film (heat-sink material such as aluminum, gold and silver, and various alloys that include at lest one of them) can be layered in addition to a major material. Particularly, in a case that the recording layer 9 is formed by a phase change material, by laminating a dielectric material such as ZnS, SiO, SiN, SiC, AlO, AlN, MgF and ZrO on the above-mentioned recording material, reflectivity can be optimized, reproduction luminous energy can be increased. Further, a number of rewriting frequency, reproducing characteristic, recording characteristic and storage stability can be improved.

Furthermore, commonly known layers such as an antistatic layer, a lubricative layer and a hard coat layer can be formed on the light transmitting layer 10 on the opposite side to the recording layer 9 although they are not shown in drawings. With respect to an actual material for the antistatic layer, a resin such as energy ray curable resin and thermosetting resin that are dispersed with surface-active agent and conductive particles can be used. With respect to an actual material for the lubricative layer, liquid lubricant of which surface energy is adjusted by modifying hydrocarbon macromolecule with silicon and fluorine can be used. Thickness of the lubricative layer is desirable to be within a range of 0.1 nm to 10 nm approximately. More, with respect to an actual material for the hard coat layer, a resin, which transmits more than 70% of light having wavelength $\lambda$, such as thermosetting resins, various energy ray curable resins (including examples of UV ray curable resins, visible radiation curable resins and electron beam curable resins), moisture curable resin, plural liquid mixture curable resin and thermoplastic resin containing solvent can be used.

The hard coat layer is desirable to exceed a certain value of the "scratch test by pencil" regulated by the Japanese Industrial Standard (JIS) K5400 in consideration of abrasion resistance of the light transmitting layer 10. In consideration of that a hardest material of the objective lens is glass, a value of the "scratch test by pencil" for the hard coat layer is most preferable to be more than the "H" grade. If the test value is less than the "H" grade, dust that is caused by scraping the hard coat layer is remarkably generated. Consequently, an error rate is deteriorated abruptly. Thickness of the hard coat layer is desirable to be more than 0.001 mm in consideration of shock resistance, more desirable to be less than 0.01 mm in consideration of warp of an total information recording medium 10. With respect to other materials for the hard coat layer, an element, which transmits more than 70% of light having a wavelength $\lambda$ and has a value of the "scratch test by pencil" of more than the "H" grade, such as carbon, molybdenum and silicon, and their alloy (including composition such as oxide, nitride, sulfide, fluoride and carbide) can be used (its film thickness is within a range of 1 nm to 1000 nm).

A label printing can be applied on the surface of the substrate 8 on the opposite side to the recording layer 9 although the label printing is not shown in any drawings. Various energy ray curable resins containing pigment and dye (such as UV ray curable resin, visible radiation curable resin and electron beam curable resin) can be used suitably for the label printing. Thickness of the label printing is desirable to be more than 0.001 mm in consideration of visibility of the printing, more desirable to be less than 0.05 mm in consideration of warp of the total information recording medium 11.

A hologram for identifying the information recording medium 11 and a visible microscopic pattern can be formed in an area other than a predetermined area for recording.

An information recording medium 11 can be installed in a cartridge so as to improve ability of loading the information recording medium 11 into a reproducing apparatus and protectiveness of the information recording medium 11 while loading.

A record mark "M", which is recorded on the information recording medium 11 by a user, can be recorded by either the mark position recording method or the mark end recording method. A signal, which is used for recording, is a modulation signal that is a so-called (d, k) code, which is defined as that a minimum mark length is "d+1" and a maximum mark length is "k+1", wherein either a fixed length code or a variable length code can be applied for a (d, k) modulation signal. Actually, with defining that a minimum mark length is 2T, a (d, k) modulation such as (1, 7) modulation, 17PP modulation, DRL modulation, (1, 8) modulation and (1, 9) modulation can be used.

An example representing the (1, 7) modulation of the fixed length code is the "D1, 7" modulation (that is disclosed in the Japanese Patent Application No. 2001-80205 in the name of Victor company of Japan, Limited). The "D1, 7" modulation can be replaced by the (1, 7) modulation or the (1, 9) modulation, which is based on the "D4, 6" modulation of the fixed length code (that is disclosed in the Japanese Patent Application Laid-open Publication No. 2000-332613). The 17PP modulation is one of the (1, 7) modulation of the variable length code and disclosed in the Japanese Patent Application Laid-open Publication No. 11-346154/1999.

With respect to the (2, 7) modulation and the (2, 3) modulation, which are the variable length code with defining the minimum mark length as 3T, the EFM modulation, the EFM plus modulation and the "D8-15" modulation (that is disclosed in the Japanese Patent Application Laid-open Publication No. 2000-286709) can be used. Further, a modulation system, which defines the minimum mark length as 4T (such as the (3, 17) modulation), and another modulation system, which defines the minimum mark length as 5T, (such as the (4, 21) modulation) can be used.

With referring to FIGS. 28 and 29, a first reproducing apparatus, which is used for reproducing an information recording medium 11 of the present invention, is explained.

In FIG. 28, a first reproducing apparatus 500 is at least composed of a pickup 50 for reading out reflected light from an information recording medium 11, a motor 51 for rotating the information recording medium 11, a servo controller 52 for controlling to drive the pickup 50 and the motor 51, a turntable 53 for supporting the information recording medium 11 while rotating, a demodulator 54 for demodulating an information signal that is read out by the pickup 50, an interface (I/F) 55 for outputting a signal that is demodulated by the demodulator 54 and a controller 60 that controls the first reproducing apparatus 500 totally.

The demodulator 54 hereupon is a digital converter that returns 16-bit data to original 8-bit data if a reproduced signal is modulated by the EFM plus modulation (8-16 modulation) method, which is commonly used for the DVD system.

The turntable 53 and the information recording medium 11 are connected with plugging a center hole Q of the information recording medium 11 with the turntable 53. Such a connection between the turntable 53 and the information recording medium 11 can be either a fixed connection or semi-fixed connection, which can load or release the information recording medium 11 freely. Further, the information recording medium 11 can be installed in a cartridge. With respect to a cartridge, a commonly known cartridge having an opening and closing mechanism in the center can be used as it is.

The motor 51 is linked to the turntable 53, supports the information recording medium 11 through the turntable 53 and supplies relative motion for reproduction to the information recording medium 11. A signal output can be supplied to a not shown external output terminal or directly supplied to a not shown display device, audio equipment or printing equipment.

The pickup 50 is at least composed of a light emitting element 50a, which emits light having single wavelength λ within a range of 350 nm to 450 nm, desirably 400 nm to 435 nm, an objective lens 50b having numerical aperture NA within a range of 0.75 to 0.9 and a 4-division photo detector 50c, which receives reflected light that is reflected by the information recording medium 11 although they are not shown in FIG. 28. Furthermore, the pickup 50 forms reproducing light 99 in conjunction with these components. It is acceptable that the light emitting element 50a is a semiconductor laser of gallium nitride system compound or a laser having a second harmonic generating element.

According to an actual survey that is made by the inventor of the present invention, laser RIN (Relative Intensity Noise) of a second harmonic generating element is −134 dB/Hz and that of a semiconductor laser of gallium nitride system compound is −125 dB/Hz. The noise level of the semiconductor laser of gallium nitride system compound is larger than that of the second harmonic generating element by 9 dB. However, both of them can be used suitably.

With referring to FIG. 29, the photo detector 50c is explained hereupon.

FIG. 29 is a plan view of the photo detector 50c, which shows a division state and relative relation with the information recording medium 11.

In FIG. 29, the photo detector 50c is divided into four elements. In other words, four divided elements A, B, C and D are allocated so as to be related to the radial direction and the tangential direction of the information recording medium 11. Electric currents, which are obtained from each of the elements A, B, C and D when they receive light, are Ia, Ib, Ic and Id respectively. In a case of generating a total sum signal, all currents are summed up to "(Ia+Ib+Ic+Id)". Further, in a case of generating a differential signal (push-pull signal), by subtracting each sum in the tangential direction, "(Ia+Ib)−(Ic+Id)" is produced.

The servo controller 52 is indicated just one in FIG. 28. However, it can be divided into two; one is a driving control servo for the pickup 50 and the other is another driving control servo for the motor 51. A commonly know equalizer and a PRML (partial response maximum likelihood) decoding circuit, which are not shown, can be installed in the demodulator 54. With respect to an equalizer (waveform equalizer), for example, a so-called neural net equalizer (that is disclosed in the Japanese Patent No. 2797035) in which a plurality of conversion systems having a nonlinear input-output characteristic is combined together with applying individual variable weighting and constitutes a neural network, a so-called limit equalizer (that is disclosed in the Japanese Patent Application Laid-open Publication No. 11-259985/1999) in which an amplitude level of reproduced signal is limited to a predetermined value and forwarded to a filtering process, and a so-called error selection type equalizer (that is disclosed in the Japanese Patent Application Laid-open Publication No. 2001-110146) in which an error between a reproduced signal and an objective value for waveform equalization is obtained and a frequency of the waveform equalizer is changed adaptively so as to minimize the error can be preferably used.

Further, in the commonly known PRML decoding circuit that contains a predicted value controlling and equalization error calculating circuit, a so-called adaptive viterbi decoder (that is disclosed in the Japanese Patent Application Laid-open Publications No. 2000-228064 and No. 2001-186027) in which a predicted value utilized for decoding viterbi algorithm is calculated and a frequency response is optimized so as to minimize an equalization error of waveform equalizer can be suitably used.

Operations of the first reproducing apparatus 500 are explained next.

The first reproducing apparatus 500 is explained hereupon with assuming that it reproduces user data, which is recorded in a groove "G" of an information recording medium 11 having the fourth microscopic pattern 3C. The reproducing light 99 is emitted from the light emitting element 50a in the pickup 50 through the objective lens 50b and converged on the fourth microscopic pattern 3C of the information recording medium 11. Actually, the reproducing light 99 is focused on the fourth microscopic pattern 3C, which is provided at a depth of 50 μm to 120 μm that is equivalent to the thickness of the light transmitting layer 10, and conducted to track the groove "G" thereafter.

The photo detector 50c receives reflected light from the fourth microscopic pattern 3C and reads out a recorded signal. At the moment, a total sum signal of the photo detector 50c is transmitted to the demodulator 54, and then original information is restored thereat. As mentioned above, reading out a recorded signal is performed by tracking to a groove "G" on the fourth microscopic pattern 3C and reproducing a record mark "M" that is recorded on the groove "G".

It is omitted in the above explanation that a focus error signal is necessary for focusing to be generated and a tracking error signal is necessary for tracking to be generated.

Such a focus error signal and a tracking error signal are generated by a differential signal (that is, "(Ia+Ib)−(Ic+Id)"), which is outputted from the 4-division photo detector 50c in the radial direction, and transmitted to the servo controller 52. In the servo controller 52, a focus servo signal and a tracking servo signal are generated from the received focus error signal and the tracking error signal in accordance with control by the controller 60, and transmitted to the pickup 50. In the meantime, a rotary servo signal is also generated in the servo controller 52 and transmitted to the motor 51.

Further, in the demodulator 54, the recorded signal is demodulated and applied with error correction as required, and a data stream that is obtained is transmitted to the I/F 55. Finally, a signal is outputted externally in accordance with control by the controller 60.

As mentioned above, the first reproducing apparatus 500 of the present invention is loaded with an information recording medium 11 and designed for coping with the reproducing light 99, which is generated by the light emitting element 50a having single wavelength λ within the range of 350 nm to 450 nm, the objective lens 50b having the numerical aperture NA of 0.75 to 0.9 and the 4-division photo detector 50c. Therefore, the first reproducing apparatus 500 can preferably reproduce the information recording medium 11.

The first reproducing apparatus 500 is such a reproducing apparatus that reads out user data, which is recorded on the recording layer 9, and can reproduce contents, which are continuously recorded for a long period of time. It can be used for reproducing an HDTV program and a movie, which are recorded by video equipment, for example.

With referring to FIG. 30, a second reproducing apparatus according to the present invention is explained.

In FIG. 30, a second reproducing apparatus 510 is identical to the first reproducing apparatus 500 except for an address information demodulator 56, which is provided between the pickup 50 and the controller 60 and demodulates an address information that is read out by the pickup 50. The second reproducing apparatus 510 is used for index reproduction of a HDTV program and a movie, which are recorded by video equipment, and for index reproduction of a computer that stores data.

As mentioned above, a signal that is transmitted from the pickup 50 to the demodulator 54 is the total sum signal "(Ia+Ib+Ic+Id)" of the 4-division photo detector 50c. On the other hand, another signal that is transmitted from the pickup 50 to the address information demodulator 56 is the differential signal "(Ia+Ib)−(Ic+Id)" in the radial direction of the 4-division photo detector 50c. Address information is formed in the information recording medium 11 as a wobbling groove. The wobbling is formed in the radial direction, so that the address signal can be extracted by monitoring the differential signal.

With respect to an actual constitution of the address information demodulator 56, it is constituted by at least any one of an amplitude-shift keying modulation demodulator, a frequency-shift keying modulation demodulator and a phase-shift keying modulation demodulator.

More accurately, an envelope detector circuit can be suitably used for the amplitude-shift keying modulation demodulator. A frequency detector circuit and a synchronous detector circuit can be suitably used for the frequency-shift keying modulation demodulator. A synchronous detector circuit, a delay detector circuit and an envelope detector circuit can be suitably used for the phase-shift keying modulation demodulator.

The amplitude-shift keying modulation wave 250, the frequency-shift keying modulation wave 260 and the phase-shift keying modulation wave 270, which constitute an auxiliary signal area are inputted to the address information demodulator 56 and address information is demodulated from the differential signal in the radial direction of the 4-division photo detector 50c.

The total sum signal may leak into the differential signal in the radial direction although it may be a small amount. In order to avoid such leaking, a band-pass filter that is adjusted for a frequency range of an auxiliary signal can be inserted between the pickup 50 and the address information demodulator 56.

Operations of the second reproducing apparatus 510 are explained next.

The second reproducing apparatus 510 is explained hereupon with assuming that it reproduces address information, which is formed on a groove "G" of an information recording medium 11 having the fourth microscopic pattern 3C, and user data, which is recorded in a recording layer 9 of the information recording medium 11. The reproducing light 99 is emitted from the light emitting element 50a in the pickup 50 through the objective lens 50b and converged on the fourth microscopic pattern 3C of the information recording medium 11. Actually, the reproducing light 99 is focused on the fourth microscopic pattern 3C, which is provided at a depth of 50 μm to 120 μm that is equivalent to the thickness of the light transmitting layer 10, and conducted to track the groove "G" thereafter.

A differential signal is generated by the 4-division photo detector 50c in the pickup 50 and transmitted to the address information demodulator 56, and then address information is read out thereat. At this moment, the read-out address information is compared with an address for indexing data, which is inputted to the controller 60. In a case that the read-out address information and the address for indexing data do not correspond to each other, the controller 60 sends a signal to the servo controller 52 and instructs the servo controller 52 to search. The searching is performed such that a number of revolution of the motor 51 is reset to a number of revolutions, which corresponds to a radius between the motor 51 and the pickup 50, according to movement in the radial direction of the pickup 50 while scanning the movement of the pickup 50 in the radial direction.

During a process of scanning, an address outputted from the address information demodulator 56, which receives a differential signal from the pickup 50, is compared with a predetermined address. The searching continues until they coincide with each other. When they coincide, scanning in the radial direction is interrupted and reproduction is switched over to continuous reproduction. An output from the demodulator 54, which is inputted with the total sum signal (Ia+Ib+Ic+Id), is resulted in demodulating a data stream that is obtained by indexing and the output is inputted to the interface (I/F) 55. Finally, the I/F 55 outputs a signal externally in accordance with controlling of the controller 60.

As mentioned above, the second reproducing apparatus 510 of the present invention is loaded with an information recording medium 11 and designed for coping with the reproducing light 99, which is generated by the light emitting element 50a having single wavelength λ within the range of 350 nm to 450 nm, the objective lens 50b having the numerical aperture NA of 0.75 to 0.9. Therefore, the second reproducing apparatus 510 can preferably reproduce the information recording medium 11. At the same time, the second reproducing apparatus 510 can perform index reproduction of a data stream by reproducing an address thereto.

With referring to FIG. 31, a recording apparatus according to an embodiment of the present invention is described next.

Constitution-wise, a recording apparatus 600 is equivalent to the second reproducing apparatus 510 except for a circuit that processes a signal to be recorded. Therefore, detailed explanations for the same components will be omitted.

As shown in FIG. 31, the recording apparatus 600 is equivalent to the second reproducing apparatus 510 shown in FIG. 22 except for that the demodulator 54 is replaced by a modulator 82 for modulating an original data and a waveform converter 83 for transforming a modulated signal from the modulator 82 into a waveform suitable for recording on an information recording medium 11, which are connected in series. Further the I/F 55 is replaced by an interface (I/F) 81 for receiving an external signal to be recorded.

The recording apparatus 600 is an apparatus for recording a computer data, for example, at a predetermined address newly or recording a HDTV program or a movie continuously from a predetermined address by a video recorder.

The modulator 82 is such a modulator that converts an 8-bit original data into 16 bits, in the case of the EFM plus modulation system. The waveform converter 83 transforms a modulated signal that is received from the modulator 82 into a waveform that is suitable for recording on an information recording medium 11.

Actually, the waveform converter 83 is such a converter that converts a modulated signal into a recording pulse, which satisfies a recording characteristic of the recording layer 9 of the information recording medium 11. In a case that the recording layer 9 is composed of a phase change material, for example, a so-called multi-pulse is formed. In other words, the modulated signal is divided into a unit of channel bits or less and recording power is changed into a rectangular waveform, wherein peak power, bottom power, erase power and a pulse time duration, which constitute a multi-pulse, are adjusted in accordance with a direction of a controller 60.

Operations of the recording apparatus 600 are explained next.

The recording apparatus 600 is explained hereupon with assuming that it reads out address information, which is formed on a body of a groove "G" in an information recording medium 11 having the fourth microscopic pattern 3C, and records user data on a recording layer 9 in accordance with the address information.

Reproducing light 99 is emitted from the light emitting element 50a of the pickup 50 through the objective lens 50b and converged on the fourth microscopic pattern 3C in the information recording medium 11.

Actually, the reproducing light 99 is focused on the fourth microscopic pattern 3C, which is provided at a depth of 50 μm to 120 μm that is equivalent to the thickness of the light transmitting layer 10, and conducted to track the groove "G". Succeedingly, the differential signal "(Ia+Ib)−(Ic+Id)" in the radial direction that is outputted from the pickup 50 is transmitted to the address information demodulator 56 and address information is read out therein. The address information is compared with an address for indexing data that is inputted to the controller 60 thereat.

In a case that they do not correspond to each other, the controller 60 sends a signal to the servo controller 52 and instructs the servo controller 52 to search.

Searching is performed such that a number of revolutions of the motor 51 is reset to a number of revolutions, which is suitable for a radius between the motor 51 and the pickup 50, according to movement in the radial direction of the pickup 50 while scanning the movement of the pickup 50 in the radial direction. During a process of scanning, an address outputted from the address information demodulator 56, which receives a differential signal from the pickup 50, is compared with a predetermined address. The searching is continued until the outputted address and the predetermined address coincide with each other. When they coincide with each other, scanning in the radial direction is interrupted and switched over to a recording operation. In other words, data, which is outputted from the I/F 81 and inputted to the modulator 82, is modulated by the modulator 82 in accordance with controlling of the controller 60. Successively, the data that is modulated by the modulator 82 in accordance with the controlling of the controller 60 is inputted to the waveform converter 83 and transformed into a format that is suitable for recording, and then outputted to the pickup 50.

In the pickup 50, recording light 89 is generated by altering a light beam, which is emitted by the light emitting element 50a, to a recording power that is designated by the waveform converter 83 and irradiated on the information recording medium 11. Consequently, original data is recorded at a predetermined address of the information recording medium 11. It is possible to read out the differential signal "(Ia+Ib)−(Ic+Id)" in the radial direction by the recording light 89 and an address can be extracted from the address information demodulator 56 while recording. Therefore, recording in a limited area up to a certain address that is desired by a user can be realized.

A format of a signal that is used for recording can be applicable for either the mark position recording method or the mark edge recording method. Further, as mentioned above, the signal that is used for recording is a so-called (d, k) code, which is defined as that a minimum mark length is "d+1" and a maximum mark length is "k+1", wherein either a fixed length code or a variable length code can be applied for the (d, k) modulation signal.

As mentioned above, the recording apparatus 600 of the present invention is loaded with an information recording medium 11 and designed for coping with the reproducing light 99 and the recording light 89, which are generated by the light emitting element 50a having single wavelength λ within the range of 350 nm to 450 nm and the objective lens 50b having the numerical aperture NA of 0.75 to 0.9. Therefore, the recording apparatus 600 can preferably record on the information recording medium 11 as well as enabling arbitrary positioning for recording by reproducing an address thereto.

While the invention has been described above with reference to fundamental areas thereof, it is apparent that many changes, modifications and variations in the arrangement of equipment and devices and in materials can be made without departing from the invention concept disclosed herein. Further, with respect to the reproducing apparatuses 500 and 510 and the recording apparatus 600 of the present invention, it should be understood that the reproducing apparatuses 500 and 510 and the recording apparatus 600 include each operation of them other than constitutions and subject matters disclosed in claims. Furthermore, the reproducing apparatuses 500 and 510 and the recording apparatus 600 include a reproducing method and a recording method, which are conducted by replacing each operations of them with each step of procedures. Moreover, it should be also understood that the reproducing apparatuses 500 and 510 and the recording apparatus 600 include a computer program that executes each step of the reproducing method and another computer program that executes each step of the recording method.

An information recording medium according to the present invention is detailed to preferred embodiments in comparison with comparative examples.

Embodiment 1

A phase change recording type information recording medium 11 (hereinafter referred to as information recording medium 11) in disciform, which is recorded and reproduced by the recording apparatus 600 shown in FIG. 31 and the reproducing apparatus 510 shown in FIG. 30, is prepared, wherein the recording apparatus 600 and the reproducing apparatus 510 are equipped with an optical pickup 50 having wavelength λ of 405 nm and numerical aperture NA of 0.85 (where S=λ/NA=476 nm).

In the information recording medium 11 according to the embodiment 1, a substrate 8 is made by polycarbonate having thickness of 1.1 mm. A recording layer 9 is composed of $Ag_{98}Pd_1Cu_1$ and $ZnSSiO_2$ (in a ratio of 80:20 at mol %), which are used along with AgInSbTe, and formed by laminating AgPdCu, $ZnSSiO_2$, AgInSbTe and $ZnSSiO_2$ in order on the substrate 8 by the sputtering method. A light transmitting layer 10 is formed by sticking polycarbonate sheet having thickness of 0.095 mm on the recording layer 9 through UV ray curable type transparent adhesive having thickness of 0.005 mm. A refractive index "n" of the light transmitting layer 10 is 1.6.

Address information is modulated and formed in a wobble shape on a convex shaped section of the recording layer 9 viewed from the light transmitting layer 10 side. Both sidewalls of the convex shaped section are in synchronism with each other and in phase and formed in like a fourth microscopic pattern 3C shown in FIG. 16. In other words, the convex shaped section is formed such that both the sidewalls are in parallel to each other. The convex shaped section is identical to the fourth microscopic pattern 3C shown in FIG. 17 and formed in such that the pitch "P" satisfies an inequality P≦S and the wobbling width A in peak to peak value satisfies another inequality 0.01 S≦A≦0.15 S.

More accurately, the fourth microscopic pattern 3C is formed so as to be that P=320 nm, Δ=54 nm and elevation difference between a concave shaped section and a convex shaped section of the fourth microscopic pattern 3C is 23 nm. Further, a modulated wobble is composed of the frequency-shift keying modulation wave 262 shown in FIG. 24, which is constituted by a sine wave (or a cosine wave) as a fundamental wave. Its phase difference from the reference phase is $2\pi\pm(\pi/2.5)$ and a phase is selected for a wave so as to be continuous at a point where a frequency is changed over.

Furthermore, the recording layer 9 is initialized by changing phase of the recording layer 9 from an amorphous state in low reflectivity to a crystalline state in high reflectivity by irradiating a laser beam from the side of the light transmitting layer 10.

Recording on the information recording medium 11 according to the embodiment 1 is explained next.

The information recording medium 11 according to the embodiment 1 is loaded into the recording apparatus 600 shown in FIG. 31 that is equipped with the pickup 50 having wavelength λ of 405 nm and numerical aperture NA of 0.85. A differential signal that is reproduced from a convex shaped section (groove "G"), which projects into the light transmitting layer 10 side, is conducted to the address information demodulator 56. While comparing address information obtained therein with a desired address, the pickup 50 is guided to the desired address, and then a record mark "M" is recorded on the recording layer 9 at a convex shaped section (groove "G") that projects into the light transmitting layer 10 by the (d, k) coding method. In this process, the (d, k) coding method is the 17PP modulation system and a minimum mark length (equal to 2T) of the record mark "M" is 0.149 μm.

Recording conditions are as follows: recording peak power is 6.0 mW, bias power is 2.6 mW, each bottom power of among multi-pulses and a cooling pulse is 0.1 mW and linear velocity is 5.3 m/s. Further, the recording is a recording method of converting a modulated signal into a so-called multi-pulse by the waveform converter 83. The recording method adopts the 3-value power modulation system, which defines such that each width of head pulse and a succeeding pulse is equal to 0.4 time as long as one recording period 1T and width of a cooling pulse is equal to 0.4 time as long as one recording period 1T.

The information recording medium 11 that is recorded as mentioned above is evaluated as follows.

The information recording medium 11 according to the embodiment 1 is loaded into the second reproducing apparatus 510 shown in FIG. 30, which is equipped with the pickup 50 having wavelength λ of 405 nm and numerical aperture NA of 0.85, and evaluated by reproducing a convex shaped section (groove "G"), which projects into the light transmitting layer 10 side. A signal having modulation amplitude (equal to "(I8H–I8L)/I8H") of 0.52 is obtained from a total sum signal of the pickup 50. Further, a reproduced signal, which is obtained form the address information demodulator 54, is excellent in error rate as low as $2\times10^{-5}$ and it is found that data without any problems in practical application can be extracted. An error rate of address information that is obtained from the address information demodulator 56 is the order of 1% in a recorded portion and address data can be restored excellently. If an error rate of address information is less than 5% while reproducing after recording on the recording layer 9, data in little error can be restored by a process of error correction. Therefore, the error rate of address information in the order of 1% is extremely suitable for processing.

A manufacturing method of the substrate 8 is explained hereupon.

As shown in FIG. 1, a flat substrate 1, which is finished in flat as fine as the optical grade and is in a state of soda lime glass (containing 70% of silicon oxide), is prepared, and then, as shown in FIG. 2, a positive type energy ray sensitive film 2 is coated evenly on the surface of the flat substrate 1. The positive type energy ray sensitive film 2 decomposes through two steps when irradiated by an energy ray. A mixed material of cresol novolac resin and naphthoquinone diazide is used for the positive type energy ray sensitive film 2.

By using the first energy ray radiating apparatus 30 shown in FIG. 12, a frequency-shift keying modulation wave 262 is inputted to the beam shaper 122 through a processor, not shown, externally and a converged energy ray is irradiated on the positive type energy ray sensitive film 2. Further, the energy ray source 121 is a laser device that emits light having wavelength of 266 nm and the beam shaper 122 is an electrooptical deflection apparatus (EOD), which is composed of an electrooptical crystal element and deflects a converged energy ray to the radial direction in response to a modulated signal of address. Thus, as shown in FIG. 11, the first microscopic pattern 3 is recorded so as for each period and phase of wobbles on both sides of groove "G" to be equal to each other. The first microscopic pattern 3 shown in FIG. 3 is formed after forming a groove "G" having an address wobble through the alkali developing process.

As shown in FIG. 4, a first plating layer 4 that is composed of nickel having thickness of 250 nm is formed on the flat substrate 1 that is formed with the first microscopic pattern 3 through a thin conductive layer (not shown). Then, as shown in FIG. 5, a first plating die 5 having a second microscopic pattern 3A is produced by peeling the first plating layer 4 from the flat substrate 1.

A second plating layer 6 is formed on the first plating die 5 having the second microscopic pattern 3A, as shown in FIG. 6. As shown in FIG. 7, a second plating die 7 having a third microscopic pattern 3B (made by nickel and 300 μm thick) is produced by peeling the second plating layer 6 from the first plating die 5.

Mounting the second plating die 7 on an injection molding machine, injecting melted polycarbonate resin into the second plating die 7 and cooling down manufactures a substrate 8 shown in FIG. 8. On the surface of the substrate 8, a fourth microscopic pattern 3C that is reversely transferred from the second plating die 7 having the third microscopic pattern 3B is formed.

Embodiment 2

An information recording medium 11 according to an embodiment 2 is identical to that of the embodiment 1 except for that the (d, k) coding method is replaced by the "D4, 6" modulation system and the minimum mark length (equal to 2T) is 0.154 μm. Further, the information recording medium 11 of the embodiment 2 is evaluated by reproducing a convex shaped section that projects into the light transmitting layer 10 after recording on the convex shape section as mentioned above. A signal having modulated amplitude (equal to "(I10H−I10L)/I10H") of 0.60 is obtained. Furthermore, a reproduced signal, which is obtained from the address information demodulator 54, is excellent in error rate as low as $8 \times 10^{-6}$ and it is found that data without any problems in practical application can be extracted. Moreover, an error rate of address information is the order of 1% in a recorded portion and address data can be restored excellently.

Embodiment 3

An information recording medium 11 according to an embodiment 3 is identical to that of the embodiment 1 except for that the (d, k) coding method is replaced by the "D8-15" modulation system and the minimum mark length (equal to 3T) is 0.185 μm. Further, the information recording medium 11 of the embodiment 3 is evaluated by reproducing a convex shaped section that projects into the light transmitting layer 10 after recording on the convex shape section as mentioned above. A signal having modulated amplitude (equal to "(I12H−I12L)/I12H") of 0.63 is obtained. Furthermore, a reproduced signal, which is obtained from the address information demodulator 54, is excellent in error rate as low as $4 \times 10^{-6}$ and it is found that data without any problems in practical application can be extracted. Moreover, an error rate of address information is the order of 1% in a recorded portion and address data can be restored excellently.

Embodiment 4

An information recording medium 11 according to an embodiment 4 is identical to that of the embodiment 1 except for that address information is recorded on a convex shaped section (groove "G"), which projects into the light transmitting layer 10, as a wobble by a phase-shift keying modulation wave 272. Further, the information recording medium 11 of the embodiment 4 is evaluated by reproducing a convex shaped section that projects into the light transmitting layer 10 after recording on the convex shape section as mentioned above. A signal having modulated amplitude (equal to "(I8H−I8L)/I8H") of 0.52 is obtained. Furthermore, a reproduced signal, which is obtained from the address information demodulator 54, is excellent in error rate as low as $2 \times 10^{-5}$ and it is found that data without any problems in practical application can be extracted. Moreover, an error rate of address information is the order of 0.1% in a recorded portion and address data can be restored excellently.

Embodiment 5

A phase change recording type information recording medium 11 (hereinafter referred to as information recording medium 11) in disciform, which is recorded and reproduced by the recording apparatus 600 shown in FIG. 31 and the reproducing apparatus 510 shown in FIG. 30, is prepared, wherein the recording apparatus 600 and the reproducing apparatus 510 are equipped with an optical pickup 50 having wavelength λ of 405 nm and numerical aperture NA of 0.85 (where S=λ/NA=476 nm) respectively.

Manufacturing the information recording medium 11 of the embodiment 5 is explained hereinafter.

As shown in FIG. 1, a flat silicon substrate 1, which is finished in flat as fine as the optical grade, is prepared, and then, as shown in FIG. 2, a negative type energy ray sensitive film 2 is coated evenly on one surface of the flat silicon substrate 1. The negative type energy ray sensitive film 2 becomes insoluble through two steps when irradiated by an energy ray. A bridged acrylate resin is used for the negative type energy ray sensitive film 2.

By using the second energy ray radiating apparatus 40 shown in FIG. 13, a frequency-shift keying modulation wave 262 is inputted to the beam shaper 122 through a processor, not shown, externally and a converged energy ray is irradiated on the negative type energy ray sensitive film 2. Further, the energy ray source 121 is an electron-beam irradiating apparatus and the beam shaper 122 is a beam deflecting device, which deflects a converged energy ray to the radial direction in response to a modulated signal of address. Thus, as shown in FIG. 11, the first microscopic pattern 3 is recorded so as for each period and phase of wobbles on both sides of land "L" to be equal to each other.

A land "L" having an address wobble is formed through a developing process by organic solvent. The land "L" is formed in dimensions such that the pitch "P" satisfies an inequality P≦S and the wobbling width Δ in peak to peak value satisfies another inequality 0.01S≦Δ≦0.15S. Exactly, it is formed so as to be that P=320 nm and Δ=54 nm. Further, a modulated wobble is composed of the frequency-shift keying modulation wave 262 shown in FIG. 24, which is constituted by a sine wave (or a cosine wave) as a fundamental wave. Its phase difference from the reference phase is 2π±(π/2.5) and a phase is selected for a wave so as to be continuous at a point where a frequency is changed over.

By plating nickel in 300 μm thick through a thin conductive film and peeling off the nickel plating layer, as shown in FIG. 14, a third plating die 12 (of nickel in 250 μm thick) having a fifth microscopic pattern 3D is formed.

Mounting the third plating die 12 on an injection molding machine, injecting melted polycarbonate resin into the third plating die 12 and cooling down manufactures a substrate 8 shown in FIG. 15. On the surface of the substrate 8, a sixth microscopic pattern 3E that is reversely transferred from the third plating die 12 having the fifth microscopic pattern 3D is formed.

Succeedingly, as shown in FIGS. 9 and 10, a recording layer 9 and a light transmitting layer 10 are formed. A forming method of these layers is identical to that of the embodiment 1. In the completed information recording medium 11, the recording layer 9 is initialized by changing phase of the recording layer 9 from an amorphous state in low reflectivity to a crystalline state in high reflectivity by irradiating a laser beam from the side of the light transmitting layer 10.

Recording on the information recording medium 11 according to the embodiment 5 is explained next.

The information recording medium 11 according to the embodiment 5 is loaded into the recording apparatus 600 shown in FIG. 31 that is equipped with the pickup 50 having wavelength λ of 405 nm and numerical aperture NA of 0.85. A differential signal that is reproduced from a convex shaped section (land "L"), which projects into the light transmitting layer 10 side, is conducted to the address information demodulator 56. While comparing address information obtained therein with a desired address, the pickup 50 is guided to the desired address, and then a record mark "M" is recorded on the recording layer 9 at a convex shaped section (land "L") that projects into the light transmitting layer 10 by the (d, k) coding method. In this process, the (d, k) coding method is the 17PP modulation system and a minimum mark length (equal to 2T) of the record mark "M" is 0.149 μm.

Recording conditions are as follows: recording peak power is 6.0 mW, bias power is 2.6 mW, each bottom power of among multi-pulses and a cooling pulse is 0.1 mW and linear velocity is 5.3 m/s. Further, the recording is performed by a recording method that converts a modulated signal into a so-called multi-pulse by the waveform converter 83. The recording method adopts the 3-value power modulation system, which defines such that each width of head pulse and succeeding pulses is equal to 0.4 time as long as one recording period 1T and width of a cooling pulse is equal to 0.4 time as long as one recording period 1T.

The information recording medium 11 of the embodiment 5 that is recorded as mentioned above is evaluated as follows.

The information recording medium 11 according to the embodiment 5 is loaded into the second reproducing apparatus 510 shown in FIG. 30, which is equipped with the pickup 50 having wavelength λ of 405 nm and numerical aperture NA of 0.85, and evaluated by reproducing a convex shaped section (land "L"), which projects into the light transmitting layer 10 side. A signal having modulation amplitude (equal to "(I8H–I8L)/I8H") of 0.53 is obtained from a total sum signal of the pickup 50. Further, a reproduced signal, which is obtained form the address information demodulator 54, is excellent in error rate as low as $2.1 \times 10^{-5}$ and it is found that data without any problems in practical application can be extracted. An error rate of address information that is obtained from the address information demodulator 56 is the order of 1% in a recorded portion and address data can be restored excellently.

As mentioned above, it is found that each information recording medium 11 of the embodiments 1 through 5 can obtain sufficient modulation amplitude and sufficiently suppress an error rate. Further, it is also found that an address signal can be demodulated excellently.

Comparative examples 1 and 2 are explained next.

COMPARATIVE EXAMPLE 1

An information recording medium according to a comparative example 1 is manufactured by the same manufacturing method as the embodiment 1 except for that a substrate 8 is formed by the injection molding method by using the first plating die 5 having the second microscopic pattern 3A. The manufacturing method for the comparative example 1 is the same manufacturing method as the stamper method that is used for manufacturing a DVD disc.

By using the recording apparatus 600 shown in FIG. 31, the information recording medium that is manufactured as mentioned above is recorded selectively on a convex shaped section, which projects into the light transmitting layer 10, by the (d, k) coding method as same manner as the embodiment 1. Then an address is reproduced by the recording apparatus 600 on trial. According to the trial reproduction, address information is incoherent.

The information recording medium of the comparative example 1 is evaluated by reproducing the convex shaped section by using the reproducing apparatus 510 shown in FIG. 30.

According to the evaluation, address information is incoherent, so that it is impossible to perform positioning by an address, which is essentially obtained from the address information. This is caused by that each period and each phase of both sidewalls of the convex shaped section are not equal to each other, that is, not parallel to each other. Consequently, different addresses interfere with each other and they are reproduced at the same time.

By reproducing areas having approximately the same radius by the second reproducing apparatus 510 shown in FIG. 30, a signal having modulation amplitude (equal to "(I8H–I8L)/I8H") of 0.52 is obtained from a total sum signal of the pickup 50 although positioning can not be performed. Further, a reproduced signal, which is obtained form the address information demodulator 54, is excellent in error rate as low as $2 \times 10^{-5}$ and it is found that data without any problems in practical application can be extracted. However, address information that is obtained from the address information demodulator 56 is interfered and incoherent data as the same condition as the trail reproduction by the recording apparatus 600 mentioned above.

Accordingly, the information recording medium of the comparative example 1 is resulted in defective.

COMPARATIVE EXAMPLE 2

An information recording medium according to a comparative example 2 is manufactured by the same manufacturing method as the comparative example 1. By using the recording apparatus 600, the information recording medium that is manufactured as mentioned above is recorded selectively on a convex shaped section, which projects into the light transmitting layer 10, by the (d, k) coding method as same manner as the embodiment 1. In this case, address information is correctly demodulated, so that it is revealed that recording by correct positioning can be performed.

Then the recorded information recording medium is evaluated by reproducing the convex shaped section by using the reproducing apparatus 510 shown in FIG. 30. Address information that is obtained from a differential signal of the pickup 50 in the address information demodulator 56 is the order of 1% in a recorded portion and address data can be restored excellently.

On the contrary, a weak signal of which modulation amplitude (equal to "(I8H–I8L)/I8H") is the order of 0.37 is obtained from a total sum signal of the pickup 50. Further, an error rate of reproduced signal, which is obtained form the address information demodulator 54, is $2 \times 10^{-3}$. Consequently, data that is full of errors is reproduced.

Accordingly, the information recording medium of the comparative example 2 is defective.

As exhibited in the embodiments 1 through 5 and the comparative examples 1 and 2, by using the information recording medium 11, which is composed of the light transmitting layer 10 having thickness within a range of 0.05 mm to 0.12 mm and recorded with address information that is modulated so as to be the same period and phase on both sidewalls of a convex shaped section that projects into the light transmitting layer 10. Further, by recording on and reproduced from the convex shaped section, the information recording medium 11 can be an ideal information recording medium that satisfies all parameters of recording on the recording layer 9 such as modulation amplitude, an error rate and an address error rate totally.

EFFECTS OF INVENTION

According to an aspect of the present invention, there provided an information recording medium, which can be recorded with information on a convex shaped section, which is viewed from a side that is irradiated with a laser beam. A reproduced signal in high output and high quality can be obtained, so that recording and reproducing in low error rate and high density can be realized. Further, each wobbling period and phase of both sidewalls of a convex shaped section, which is viewed from a side that is irradiated with a laser beam, are equal to each other, so that interference is eliminated and resulted in reproducing accurate address information.

It should be understood that many modifications and adaptations of the invention will become apparent to those skilled in the art and it is intended to encompass such obvious modifications and changes in the scope of the claims appended hereto.

What is claimed is:

1. An information recording medium comprising:
    a substrate having a microscopic pattern, which includes a shape of continuous substance of approximately parallel grooves formed with a convex shaped section and a concave shaped section alternating on a surface of the substrate;
    a recording layer formed on the microscopic pattern; and
    a light transmitting layer having thickness of 0.05 mm to 0.12 mm formed on the recording layer,
    the microscopic pattern satisfying a relation of $P \leq \lambda/NA$, wherein P is a pitch of the convex shaped section, $\lambda$ is a wavelength of a reproducing light beam and NA is a numerical aperture of an objective lens, and
    further wherein the microscopic pattern includes a modulated address information formed on both side walls of the convex shaped section viewed from the light transmitting layer as a wobble, both the side walls being parallel to each other, and
    furthermore wherein the information recording medium is installed in a cartridge.

2. An information recording medium comprising:
    a substrate having a microscopic pattern, which includes a shape of continuous substance of approximately parallel grooves formed with a convex shaped section and a concave shaped section alternating on a surface of the substrate;
    a recording layer formed on the microscopic pattern; and
    a light transmitting layer having thickness of 0.05 mm to 0.12 mm formed on the recording layer,
    the microscopic pattern satisfying a relation of $P \leq \lambda/NA$, wherein P is a pitch of the convex shaped section, $\lambda$ is a wavelength of a reproducing light beam and NA is a numerical aperture of an objective lens, and
    further wherein the microscopic pattern includes a modulated address information formed on both side walls of the convex shaped section viewed from the light transmitting layer as a wobble having a same period and phase with respect to both the side walls, and
    furthermore wherein the convex shaped section is formed by the constant angular velocity (CAV) method.

3. A reproducing apparatus for reproducing an information recording medium comprising:
    a substrate having a microscopic pattern, which includes a shape of continuous substance of approximately parallel grooves formed with a convex shaped section and a concave shaped section alternating on a surface of the substrate;
    a recording layer formed on the microscopic pattern; and
    a light transmitting layer having thickness of 0.05 mm to 0.12 mm formed on the recording layer,
    the microscopic pattern satisfying a relation of $P \leq \lambda/NA$, wherein P is a pitch of the convex shaped section, $\lambda$ is a wavelength of a reproducing light beam and NA is a numerical aperture of an objective lens, and
    further wherein the microscopic pattern includes a modulated address information formed on both side walls of the convex shaped section viewed from the light transmitting layer as a wobble, both the side walls being parallel to each other,
    the reproducing apparatus at least comprising:
    a motor for rotating the information recording medium; and
    a turntable for supporting the information recording medium.

* * * * *